United States Patent
Hejderup et al.

(10) Patent No.: US 12,462,043 B1
(45) Date of Patent: *Nov. 4, 2025

(54) CREATING AND USING CALL GRAPHS TO SELECT AN UPDATE

(71) Applicant: Endor Labs Inc, Palo Alto, CA (US)

(72) Inventors: Joseph Hejderup, Palo Alto, CA (US); Philip Hamer, Palo Alto, CA (US); Georgios Apostolopoulos, San Jose, CA (US); Dimitrios Styliadis, San Jose, CA (US)

(73) Assignee: Endor Labs Inc, Palo Alto, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/191,857

(22) Filed: Apr. 28, 2025

Related U.S. Application Data

(63) Continuation of application No. 19/020,659, filed on Jan. 14, 2025, and a continuation of application No. 18/951,189, filed on Nov. 18, 2024.

(51) Int. Cl.
    *G06F 21/57*     (2013.01)
    *G06F 21/62*     (2013.01)
    (Continued)

(52) U.S. Cl.
    CPC ........ *G06F 21/577* (2013.01); *G06F 21/6218* (2013.01); *G06F 21/552* (2013.01); *G06F 21/565* (2013.01); *G06F 21/70* (2013.01)

(58) Field of Classification Search
    None
    See application file for complete search history.

(56) References Cited

U.S. PATENT DOCUMENTS

| | | | |
|---|---|---|---|
| 8,627,327 B2 * | 1/2014 | Dunshea | G06F 9/5022 |
| | | | 711/158 |
| 10,108,975 B1 * | 10/2018 | Benner | G16H 50/20 |

(Continued)

FOREIGN PATENT DOCUMENTS

| | | | | |
|---|---|---|---|---|
| CN | 116842522 A | * | 10/2023 | ........... G06F 21/577 |
| CN | 118467790 A | * | 8/2024 | ......... G06F 16/9024 |

OTHER PUBLICATIONS

Istvan-Attila Csaszar and Radu Razvan Slavescu (Interactive call graph generation for software projects); pp. 8; Published on IEEE in Nov. 26, 2020.*

(Continued)

*Primary Examiner* — Ali H. Cheema
(74) *Attorney, Agent, or Firm* — Flagship Patents; Shiv S. Naimpally

(57) ABSTRACT

In some implementations, a set of dependencies in a selected package are determined. Each dependency in the set of dependencies is used to create a set of partial call graphs that are stitched together to create a complete call graph of the package. A subset of upgrade candidates may be selected from a set of upgrade candidates for a particular dependency. Determining issues associated with upgrading the package to use an upgrade candidate includes determining security vulnerabilities based on the complete call graph, determining a number of vulnerabilities addressed by upgrading the package to use the upgrade candidate, and determining a severity of vulnerabilities addressed by upgrading the package to use the upgrade candidate. A risk-benefit score associated with each of the upgrade candidates is determined to create a subset of upgrade candidates prioritized based on the risk-benefit score. The prioritized subset is provided to a developer associated with the package.

20 Claims, 9 Drawing Sheets

(51) Int. Cl.
    *G06F 21/55*     (2013.01)
    *G06F 21/56*     (2013.01)
    *G06F 21/70*     (2013.01)

(56) References Cited

U.S. PATENT DOCUMENTS

| | | | |
|---|---|---|---|
| 10,917,415 B2* | 2/2021 | Chen | G06N 3/04 |
| 11,930,013 B1* | 3/2024 | Zhang | G06F 16/9024 |
| 2005/0055565 A1* | 3/2005 | Fournet | G06F 21/577 |
| | | | 726/26 |
| 2013/0083030 A1* | 4/2013 | Fukuda | G06F 8/34 |
| | | | 345/440 |
| 2014/0013315 A1* | 1/2014 | Genevski | G06F 8/60 |
| | | | 717/170 |
| 2017/0206123 A1* | 7/2017 | Kirkpatrick | H04L 67/146 |
| 2017/0286099 A1* | 10/2017 | Wilkinson | G06F 8/65 |
| 2020/0053175 A1* | 2/2020 | Bodman | H04L 67/535 |
| 2021/0281597 A1* | 9/2021 | Guiroux | H04L 63/1433 |
| 2022/0222351 A1* | 7/2022 | Levin | G06F 8/71 |
| 2024/0370570 A1* | 11/2024 | Betthauser | G06F 21/577 |

OTHER PUBLICATIONS

Mehdi Keshani, Georgios Gousios and Sebastian Proksch (Frankenstein: fast and lightweight call graph generation for software builds); pp. 47; Published in Nov. 16, 2023.*
Mehdi Keshani (Scalable Call Graph Constructor for Maven); pp. 3; Published in Mar. 28, 2021).*
V. Benjamin Livshits and Monica S. Lam (Finding Security Vulnerabilities in Java Applications with Static Analysis); pp. 16; Published in (Year: 2005).*

* cited by examiner

Dep1:0   404

TH = {/dep1package/Dep1}

CS={source = {1}, create={1}}

/dep1package/Dep1
parent = /dep2package/Dep2
Super interfaces = {}
Methods={source(), m1(), create()/dep2package/Dep2} source.pc = 1
instruction = invokestatic
receiver type = /dep2package/Dep2
signature = target()

create.pc = 1
instruction = invokespecial
receiver type = /dep1package/Dep1
signature = init<>()

App:0   402

TH = {/apppackage/App}

CS = {main(/java.lang/String[]) = {1, 2}}

/apppackage/App
parent = /java.lang/Object
super interfaces = {}
Methods = {main(java.lang/String[])} main.pc = 1
receiver type = /dep1package/Dep1
instruction = invokestatic
signature = create()/dep2package/Dep2 main.pc = 2
receiver type = /dep2package/Dep2
instruction = invokevirtual
signature = m1()

Dep2:0   406

TH = {/dep2package/Dep2}

CS = {}

/dep2package/Dep2
parent = /java.lang/Object
super interfaces = {}
methods= {target(), m1(), m2()}

Figure 5:
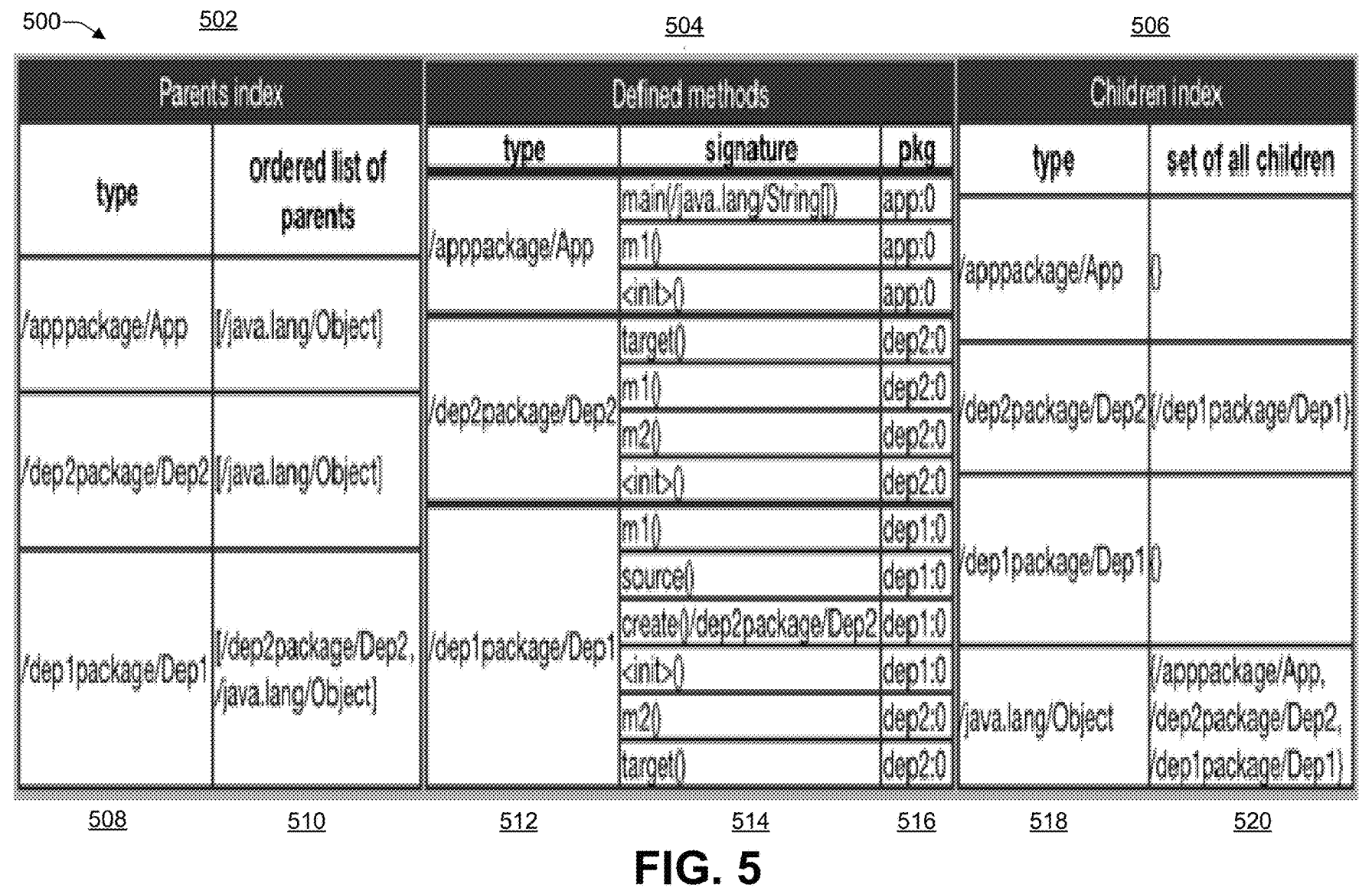

| Parents index (502) | | Defined methods (504) | | | Children index (506) | |
|---|---|---|---|---|---|---|
| type (508) | ordered list of parents (510) | type (512) | signature (514) | pkg (516) | type (518) | set of all children (520) |
| /apppackage/App | [/java.lang/Object] | /apppackage/App | main(/java.lang/String[]) | app1.0 | /apppackage/App | |
|  |  |  | m1() | app1.0 |  |  |
|  |  |  | <init>() | app1.0 |  |  |
| /dep2package/Dep2 | [/java.lang/Object] | /dep2package/Dep2 | target() | dep2.0 | /dep2package/Dep2 | /(dep1package/Dep1) |
|  |  |  | m1() | dep2.0 |  |  |
|  |  |  | m2() | dep2.0 |  |  |
|  |  |  | <init>() | dep2.0 |  |  |
| /dep1package/Dep1 | [/dep2package/Dep2, /java.lang/Object] | /dep1package/Dep1 | m1() | dep1.0 | /dep1package/Dep1 | |
|  |  |  | source() | dep1.0 |  |  |
|  |  |  | create()/dep2package/Dep2 | dep1.0 |  |  |
|  |  |  | <init>() | dep1.0 |  |  |
|  |  |  | m2() | dep2.0 | /java.lang/Object | [/apppackage/App, /dep2package/Dep2, /dep1package/Dep1] |
|  |  |  | target() | dep2.0 |  |  |

CREATING AND USING CALL GRAPHS TO SELECT AN UPDATE

The present non-provisional patent application claims priority from (1) U.S. Provisional Application 63/552,793 filed on Feb. 13, 2024 (2) is a continuation of U.S. Non-Provisional application Ser. No. 18/951,189 filed on Nov. 18, 2024 and (3) is a continuation of U.S. Non-Provisional application Ser. No. 19/020,659 filed on Jan. 14, 2025, all of which are incorporated herein by reference in their entirety and for all purposes as if completely and fully set forth herein.

BACKGROUND

In recent years, software applications have increasingly relied on third-party components, many of which are released under open-source license. These components are typically declared as dependencies in the manifest files of the software applications, e.g., by specifying the name and version of the component to be used. Prebuilt open-source components or packages are made available on package registries. Package managers download these prebuilt packages from the registries according to the dependency declarations in the applications' manifest files, making the code included within these packages available in the applications' development or runtime environments.

However, these open-source components often suffer from security vulnerabilities, which can negatively impact the applications that use them, either directly or indirectly. To determine whether a particular application is affected by these vulnerabilities, code-level information about the vulnerability, such as the identifiers of vulnerable functions and the identifiers of components that include those functions, are identified. Obtaining such information enables developers to employ program analysis techniques, such as static analysis or dynamic analysis, to study the vulnerable component and its use in the context of a given application. For example, reachability analysis, determines whether a particular function that is part of an open-source component can be reached by an application that directly or indirectly uses the particular function.

When a developer of a software package that uses a component in a third library determines that the component has a vulnerability, the developer may consider upgrading the software package to use a newer version of the component. Often, multiple newer versions of the component are available. A newer version may fix the vulnerability but may introduce other issues, including breaking the functionality of the package (e.g., causing it to function in a manner different than the developer intended, sometimes referred to as a breaking change). It is challenging and time consuming for the developer to review the newer versions available for each third-party component that the developer's code uses to determine which newer version of each component to use, particularly with open-source libraries that are maintained by a third party.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some implementations, a package is selected, a set of dependencies (direct and indirect) resolved, and a partial call graph created for individual dependencies. A set of partial call graphs are stitched to create a complete call graph of the package. A set of upgrade candidates for a particular dependency is determined. A subset of the upgrade candidates may be selected. Determining issues associated with upgrading the package to use an upgrade candidate includes determining security vulnerabilities based on the complete call graph, determining a number of vulnerabilities addressed by upgrading the package to use the upgrade candidate, and determining a severity of vulnerabilities addressed by upgrading the package to use the upgrade candidate. A risk-benefit score associated with individual upgrade candidates is determined to create a subset of upgrade candidates prioritized based on the risk-benefit score. The prioritized subset is provided to a developer associated with the package.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

FIG. 4 illustrates partial call graphs of example versioned packages, according to some embodiments.

FIG. 5 illustrates a global type hierarchy (GTH) of example versioned packages, according to some embodiments.

DETAILED DESCRIPTION

Figure 1:
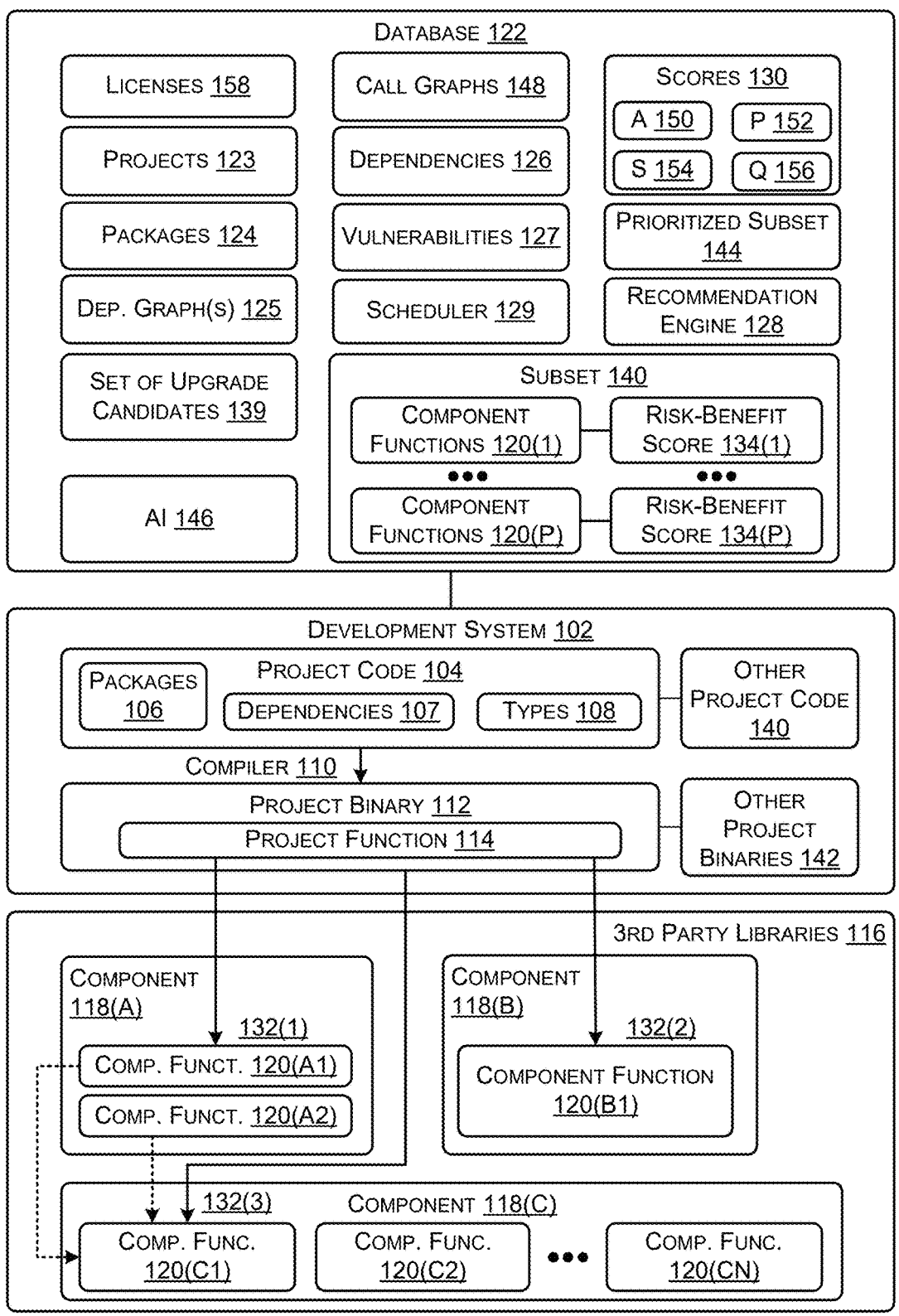
FIG. 1 illustrates a system to create a prioritized subset of upgrade candidates, according to some embodiments.

It should be understood that the following descriptions, while indicating preferred aspects and numerous specific details thereof, are given by way of illustration only and should not be treated as limitations. Changes and modifications may be made within the scope herein without departing from the spirit and scope thereof, and the present invention herein includes all such modifications.

The systems and techniques described herein enhance the security of software applications that use third-party components by determining when to upgrade to a new version of a third-party component and identifying a "best" version. The best version refers to a particular version of a component that is determined to introduce the least amount of issues after upgrading project code to use the particular component. For example, if multiple new versions of a component are available, the systems and techniques may analyze the dependency graphs associated with each version to determine which version is least likely to introduce issues, such as a breaking change (e.g., that causes the project code to function in a manner different than the developer intended). To illustrate, each of the newer versions may address a vulnerability in an older version of the component but a first version may introduce a new issue (e.g., vulnerability) while a second version may not introduce any new issues or may introduce a new issue for which a workaround is available. For these reasons, the systems and techniques may recommend the second version. If there are a large number of newer versions available, the systems and techniques may heuristically pare down the number of candidates to analyze, analyze the pared down candidates, determine a risk-benefit score (e.g., low, medium, high, a score from 0 to 9, a score from 0 to 100, or the like), and provide a prioritized list ordered based on the risk-benefit score (also referred to as a recommendation score), including a newer version having the lowest risk-benefit score (or a highest recommendation score). Each upgrade candidate is scored (risk-benefit score) based on a tradeoff between (1) the upgrade risk and (2) the benefit of the upgrade (vulnerabilities addressed by the upgrade). The benefit of the upgrade takes into account the number of vulnerabilities and a severity of each of the vulnerabilities addressed by the upgrade. For example, given the same upgrade risk, an upgrade that resolves one or two major (severe) vulnerabilities receives a better risk-benefit score than an upgrade that resolves three or four relatively minor vulnerabilities.

Project code that uses (e.g., has a dependency) on a third-party component is typically upgraded when there is a newer version that is "better" than the current version that is currently being used by the project code. A newer version that is better means the newer version addresses issues (e.g., vulnerabilities) present in the current version and, based on an analysis of the dependency graph, does not appear to introduce new issues. Such a version may receive a highest recommendation score (lowest risk-benefit score). Determining when to upgrade and to which version to upgrade is very time consuming for a developer. The systems and techniques described herein dramatically reduce the amount of developer time used to maintain the dependencies of a project by performing an analysis of a set of possible updates and providing an ordered subset of one or more recommended updates.

A software development project ("project") includes project code (also referred to as source code) comprised of one or more packages. Each package has dependencies that are introduced when the source code imports (references) components in third-party libraries, such as open-source software libraries. Individual components may have multiple versions, with each version having a set of (zero or more) known vulnerabilities. Each version may have an associated set of scores including, for example, quality scores, security scores, popularity scores, activity scores, and other factors, such as number of licenses.

The systems and techniques maintain a database that includes information about multiple projects in the software development system, the packages included in each project, dependencies (e.g., third party components used by) each of the packages, vulnerabilities associated with each of the dependencies, and one or more scores associated with each of the vulnerabilities. A scheduler periodically or in response to an occurrence of a particular event, determines when an analysis of the multiple projects takes place. The particular event may include, for example, (1) publication of a new version of a third-party component used by one of the packages, (2) discovery of a new vulnerability in a dependency, or (3) a change to the project code that introduces and/or removes one or more dependencies. The analysis to determine when to upgrade to a new version of a third-party component and identifying a "best" version may include determining call graphs. These call graphs are also referred to as a static call graphs because they are determined based on an analysis of the source code rather than when the compiled code is executing.

Call graphs (CG) can be used as the foundation for static analysis that can, for example, detect security vulnerabilities or dead (unreachable) code. Such information is invaluable to developers when developing code. Call graph generation is a whole-program analysis that analyzes not just a software application, but also its dependencies. A static call graph analysis may be used to substantially improve runtime execution. When conventional call graph analysis techniques are executed in a build system, which typically has limited resources, even powerful servers may suffer from slow build times, rendering these analyses impractical. The systems and techniques described herein strike a balance between improving static analyses while remaining practical for use cases that require quick results in low-resource environments. This is achieved using a summarization-based Class-Hierarchy Analysis algorithm for call graph generation. While Java programs are used as an example, the systems and techniques can easily be applied to other languages. The systems and techniques leverage the fact that dependency sets often do not change between builds by generating call graphs for the dependencies, caching the generated call graphs for subsequent builds, and using a unique stitching algorithm, to merge partial call graphs into a complete call graph for the whole program. Evaluation results show that this lightweight approach can substantially outperform conventional techniques to determines call graphs. In addition, the systems and techniques achieve results that are up to 38% faster than conventional techniques, while using a relatively small amount of memory (an average of 388 Megabytes of memory). This enables the systems and techniques to be used in systems with limited memory resources. This summarization-based approach for call graph generation paves the way for using extended static analyses in build processes.

Continuous integration and delivery have changed modern software engineering. Many tools and analyzers are applied in the build pipelines to enhance developers' productivity. However, this results in increased build time, which hinders build servers from providing fast feedback. Developers typically must decide between faster builds or more helpful analyses. Particularly when it comes to the use of opensource software, developers often use shared, resource-limited build services, such as like GitHub or TravisCI, which require fast and lightweight tools. Traditionally, program analysis aims at soundness as the key property and is performed through whole-program analyses, which are more precise but also expensive (in terms of time and/or computing resource usage). The systems and techniques detect vulnerable call chains and unused code using a call graph (CG), which identifies call relationships between different callable components in a system. CGs are generated by analyzing data flow and control flow of a program, including dependencies of the program.

Conventional techniques take several minutes to generate a CG of a typical program and the resulting CG may take up several gigabytes of memory, and sometimes even more during the generation of the CG. Taking several minutes and/or using several gigabytes to generate a CG is not practical for build systems nor for analyzing large codebases. The largest part of a CG typically originates from dependencies, both direct and transitive. Typically, more than 80% of programs include outdated dependencies. Between the small and frequent changes of two subsequent builds, the likelihood of dependency change is very low. The systems and techniques leverage this to reduce redundancy and thereby speed up CG generation. For example, in software ecosystems where a few popular libraries are included in many programs, caching (temporarily storing) and reusing their analysis results in faster CG generation and the use of less storage when generating the CG.

The systems and techniques determine partial CGs (PCGs) that store information about isolated dependencies (e.g., their declared types and components) and generate the CG by combining the PCGs in three steps. First, direct and transitive dependencies of the program are resolved. Second, the systems and techniques generate a PCG for each particular dependency and remember the type hierarchies defined in the particular dependency. Similar to the caching of dependencies in a build job (to prevent re-downloading), precomputed CGs (including PCGs) are cached across builds. Thus, the CGs (including PCGs) are computed (determined) once per dependency and then reused whenever the dependency is identified. Third, the systems and techniques merge the PCGs using a novel stitching algorithm. The systems and techniques may, in some cases, use Class-Hierarchy Analysis (CHA) for the CG generation. CHA is an algorithm that preserves type hierarchy and call site information which is typically the least amount of information with which to generate a CG. In contrast, a Reachability Analysis (RA) algorithm requires less information than CHA, but the usefulness of the resulting CG drastically drops due to less precision. For this reason, the systems and techniques use CHA rather than RA. In addition, it is usually not feasible to preserve the required context information for complex algorithms on shared infrastructure, as the points-to-graph and CG quickly grow to enormous sizes. Of course, in such cases, the results of the static analysis may be pruned using machine learning (ML) to reduce the sizes. Based on experiments, we have observed that after the cache is filled, the primary use case of performing subsequent builds experiences a significant improvement in execution speed, ranging from an average of 15% to 38%. The CGs generated by the systems and techniques for the whole program are comparable to those generated by the baselines. A comparison of the resulting sets of callables in the CGs reveals that the systems and techniques achieve a precision of 0.93 for OPAL and 0.99 for WALA (OPAL and WALA are conventional call graph generating tools). Moreover, on average, the systems and techniques use between 388 and 432 Megabytes (Mb) of memory to generate a whole-program CG, highlighting their efficiency in real-world applications.

Definitions

Definitions of key terms used herein are provided below. Some of these terms, as noted, may have different and/or overlapping meanings depending on the context.

Application: An application refers to a program that is the current focus of attention. It serves as the root of a dependency set and the starting point for analyses, such as dependency resolution. The application is also included in the dependency set.

Artifact: An artifact is a program distributed to users, offering features related to a core idea. Artifacts may evolve overtime, addressing existing issues or adding new functionalities.

Component: A component, also referred to as a method in Java, is a block of code that performs a specific task and is executed when called. A component is typically stored in a third party library to enable components to be reused.

Dependency: A dependency relationship occurs when one versioned package, such as A, includes (references) another versioned package, such as B, to utilize the functionality of B. In this example, A is considered the dependent program, while B is the dependency.

Dependency set: A dependency set includes versioned packages used by a program and required for the program to successfully compile. The process of determining the dependency set is referred to as dependency resolution.

Library: A library is a collection (set) of components that a program may use. A component in the library that is used by the program is a dependency because the program depends on the component to provide a particular functionality.

Method: A method, also referred to as a component herein, is a block of code designed to perform a specific task. Methods provide reusability and modularity, allowing a developer to write code once and use it multiple times.

Package: A package is synonymous with artifact and can be used interchangeably. Package is also commonly used to denote namespaces within programs. To avoid confusion, the term "Java package" is used when referring to namespaces.

Program: A program refers to a piece of code written in any programming language, regardless of its size or distribution method.

Project: A project is a domain containing multiple packages. The term project is used to represent the domain holding a groupId and containing packages.

Versioned package: A versioned package is a snapshot of an artifact at a specific point in time. Versioned packages are released on repositories ($3^{rd}$ party libraries) for use by others.

Whole program: A whole program includes the code required for successful compilation, including any versioned package listed as a dependency (including direct dependencies and transitive dependencies).

As a first example, a computer-implemented method includes selecting a package in a software project and determining a set of dependencies associated with the package. The dependencies are located in third-party libraries. The method includes generating a partial call graph for individual dependencies in the set of dependencies to create a set of partial call graphs. The method includes stitching together the set of partial call graphs to create a complete call graph of the package. The method includes determining a set of upgrade candidates for a particular dependency in the set of dependencies and, based on determining that the number of upgrade candidates in the set of upgrade candidates is greater than a predetermined threshold, heuristically selecting a subset of the upgrade candidates. If the number of upgrade candidates in the set of upgrade candidates is less than or equal to the predetermined threshold, then the set of upgrade candidates is selected as the subset of upgrade candidates. The method includes determining issues associated with upgrading the package to use the upgrade candidate, emulating a state of a dependency graph associated with upgrading the package to use the upgrade candidate, determining diamond dependencies in the dependency graph associated with upgrading the package to use the upgrade candidate, determining a number of vulnerabilities addressed by upgrading the package to use the upgrade candidate, and determining a severity of vulnerabilities addressed by upgrading the package to use the upgrade candidate. The method includes determining a risk-benefit score associated with each upgrade candidate in the subset based at least in part on: (1) the issues associated with upgrading the package to use the upgrade candidate, (2) the diamond dependencies in the dependency graph associated with upgrading the package to use the upgrade candidate, (3) the number of vulnerabilities addressed by upgrading the package to use the upgrade candidate, and (4) a severity of the vulnerabilities addressed by upgrading the package to use the upgrade candidate. The method includes prioritizing each upgrade candidate in the subset based on the associated risk-benefit score to create a prioritized subset. The method may include providing the prioritized subset to a developer associated with the package. In some cases, the method may include automatically (without human interaction) upgrading the package to use the highest priority upgrade candidate. Determining the issues associated with upgrading the package to use the upgrade candidate may include determining a number of breaking changes associated with upgrading the package to use the upgrade candidate. Determining the issues associated with upgrading the package to use the upgrade candidate may include determining an activity score indicating an amount of development activity associated with a third-party package in which the upgrade candidate is included. Determining the issues associated with upgrading the package to use the upgrade candidate may include determining a security score indicating a number of security-related issues associated with a third-party package in which the upgrade candidate is included. Determining the issues associated with upgrading the package to use the upgrade candidate may include determining a popularity score indicating an amount of usage received by a particular third-party package based at least in part on: (1) tracking source code management system metrics and (2) how many other packages have a dependency on the particular package. Determining the issues associated with upgrading the package to use the upgrade candidate may include determining a code quality score indicating how well a particular third-party package complies with best practices for code development. Determining the issues associated with upgrading the package to use the upgrade candidate may include determining a number of licenses associated with the upgrade candidate. The method may include determining security vulnerabilities based on the complete call graph. The method may include determining unreachable ("dead") code in the package based on the complete call graph.

As a second example, a server includes one or more processors and one or more non-transitory computer readable media storing instructions executable by the one or more processors to perform various operations. The operations include selecting a package in a software project and determining a set of dependencies associated with the package. The operations include generating a partial call graph for individual dependencies in the set of dependencies to create a set of partial call graphs and stitching together the set of partial call graphs to create a complete call graph of the package. The dependencies are located in one or more third-party libraries. The operations include determining a set of upgrade candidates for a particular dependency in the set of dependencies. Based on determining that the number of upgrade candidates in the set of upgrade candidates is greater than a predetermined threshold, the operations include heuristically selecting a subset of the upgrade candidates. Based on determining that the number of upgrade candidates in the set of upgrade candidates is less than or equal to the predetermined threshold, the operations include selecting the set of upgrade candidates as the subset. The operations include selecting an upgrade candidate in the subset, determining issues associated with upgrading the package to use the upgrade candidate, emulating a state of a dependency graph associated with upgrading the package to use the upgrade candidate, determining diamond dependencies in the dependency graph associated with upgrading the package to use the upgrade candidate, determining a number of vulnerabilities addressed by upgrading the package to use the upgrade candidate, and determining a severity of vulnerabilities addressed by upgrading the package to use the upgrade candidate. The operations include determining a risk-benefit score associated with each upgrade candidate in the subset based at least in part on: (1) the issues associated with upgrading the package to use the upgrade candidate, (2) the diamond dependencies in the dependency graph associated with upgrading the package to use the upgrade candidate, (3) the number of vulnerabilities addressed by upgrading the package to use the upgrade candidate, and (4) a severity of the vulnerabilities addressed by upgrading the package to use the upgrade candidate. The operations include prioritizing each upgrade candidate in the subset based on the associated risk-benefit score to create a prioritized subset. The operations may include providing the prioritized subset to a developer associated with the package. In some cases, the operations may include automatically (without human interaction) upgrading the package to use the highest priority upgrade candidate. Heuristically selecting the subset of the upgrade candidates may include selecting a predetermined number of early versions of the upgrade candidates and selecting a predetermined number of later versions of the upgrade candidates. The third-party libraries may include at least one open-source library. Determining the issues associated with upgrading the package to use the upgrade candidate may include determining a number of breaking changes that would result from upgrading the package to use the upgrade candidate. Determining the set of dependencies associated with the package may include ignoring test dependencies and ignoring unused dependencies. The operations may include determining a recommended upgrade candidate for each dependency in the set of dependencies across multiple projects with each project of the multiple projects including one or more packages and determining a set of upgrade candidates for the multiple projects. Determining the issues associated with upgrading the package to use the upgrade candidate may include determining a number of licenses associated with the upgrade candidate. The operations may include determining security vulnerabilities based on the complete call graph. The operations may include determining unreachable ("dead") code in the package based on the complete call graph.

As a third example, one or more non-transitory computer readable media capable of storing instructions are executable by one or more processors to perform various operations. The operations include selecting a package in a software project and determining a set of dependencies associated with the package. The dependencies are located in third-party libraries. The operations include generating a partial call graph for individual dependencies in the set of dependencies to create a set of partial call graphs and stitching together the set of partial call graphs to create a complete call graph of the package. The operations include determining a set of upgrade candidates for a particular dependency in the set of dependencies. Based on determining that the number of upgrade candidates in the set of upgrade candidates is greater than a predetermined threshold, the operations include heuristically selecting a subset of the upgrade candidates. Based on determining that the number of upgrade candidates in the set of upgrade candidates is less than or equal to the predetermined threshold, the operations include selecting the set of upgrade candidates as the subset. The operations include selecting an upgrade candidate in the subset. The operations include determining issues associated with upgrading the package to use the upgrade candidate, emulating a state of a dependency graph associated with upgrading the package to use the upgrade candidate, determining diamond dependencies in the dependency graph associated with upgrading the package to use the upgrade candidate, determining a number of vulnerabilities addressed by upgrading the package to use the upgrade candidate, and determining a severity of the vulnerabilities addressed by upgrading the package to use the upgrade candidate. The operations include determining a risk-benefit score associated with each upgrade candidate in the subset based at least in part on: the issues associated with upgrading the package to use the upgrade candidate, the diamond dependencies in the dependency graph associated with upgrading the package to use the upgrade candidate, the number of vulnerabilities addressed by upgrading the package to use the upgrade candidate, and a severity of the vulnerabilities addressed by upgrading the package to use the upgrade candidate. The operations include prioritizing each upgrade candidate in the subset based on the associated risk-benefit score to create a prioritized subset. The operations may include providing the prioritized subset to a developer associated with the package. In some cases, the operations may include automatically (without human interaction) upgrading the package to use the highest priority upgrade candidate. Determining the issues associated with upgrading the package to use the upgrade candidate may include determining a number of breaking changes associated with upgrading the package to use the upgrade candidate. Determining the issues associated with upgrading the package to use the upgrade candidate may include determining an activity score indicating an amount of development activity associated with a third-party package in which the upgrade candidate is included. Determining the issues associated with upgrading the package to use the upgrade candidate may include determining a security score indicating a number of security-related issues associated with a third-party package in which the upgrade candidate is included. Determining the issues associated with upgrading the package to use the upgrade candidate may include determining a popularity score indicating an amount of usage received by a particular third-party package based at least in part on: (1) tracking source code management system metrics and (2) how many other packages have a dependency on the particular package. Determining the issues associated with upgrading the package to use the upgrade candidate may include determining a code quality score indicating how well a particular third-party package complies with best practices for code development. The operations may include determining security vulnerabilities based on the complete call graph. The operations may include determining unreachable ("dead") code in the package based on the complete call graph.

FIG. 1 is a system 100 illustrating the components and relationships within a software development system, according to some embodiments. The system 100 includes a development system 102, project code 104, packages 106, dependencies 107, and types 108. The development system 102 includes a compiler 110, a project binary 112 (binary code created by compiling the project code 104), a representative project function 114, 3rd party libraries 116, components 118(A), 118(B), sub-component 118(C), component functions 120(A1), 120(B1), 120(C1), 120(C2), and relationships (dependencies) 132(1), 132(2), 132(3), 132(4). The relationships may include any type of relationship between the project function 114 and component functions 120 in the third-party libraries 116.

The development system 102 is a software environment that allows software developers to facilitate the creation, modification, and management of the project code 104. The project code 104 includes the source code files of the software project that may be managed using a version control system (VCS), such as Git or Mercurial.

The types 108 and dependencies 107 include metadata associated with the project code 104. The types 108 may include information about the data types used in the project code 104, while the dependencies 107 may include information about the other software components that the project code (104) relies on for its functionality.

The compiler 110 is a software tool that transforms the project code 104 into the project binary 112. The project binary 112 is the executable form of the software project that can be run on a computer system. The representative project function 114 is a specific part of the project code 104 that performs a particular task within the software project. Typically, a project binary has multiple project functions. For ease of understanding, the representative project function 114 is used to illustrate the function of the systems and techniques, The 3rd party libraries 116 are software components that are not developed by the project maintainers but are used within the software project to provide certain functionalities. These libraries can include components 118(A), 118(B), and sub-component 118(C) that provide specific functionalities used by the project code 104 (and the project binary 112).

The system 100 includes the development system 102 used by one or more programmers to create code, such as representative project code 104. The project code 104 is also referred to as source code and is written in a high-level language. The project code 104 may include types 108 that are explicitly defined and implicitly inherited. The project code 104 includes relationships 108 that are explicitly defined and implicitly inherited. FIG. 1 is merely an example to illustrate the systems and techniques. It should be understood that in practice, the development system 102 may include multiple project code being developed and each project code, such as the representative project code 104, may include tens or even hundreds of calls to components in third-party libraries. The development system 102 may include other project code 140 and corresponding other project binaries 142.

A compiler 110 may be used to compile the project code 104 to create a project binary 112. The project binary 112 may be an intermediate code (e.g., byte code) that is interpreted by a virtual machine, machine level code, or any combination thereof. The project binary 112 may implement at least one project function 114 to provide a particular type of functionality. The development system 102 may include other project code 128 and other project binaries 130 that are compiled versions of the other project code 128. The project code 104 may include dependencies 107 that identify portions of the other project code 128 that depends on (e.g., is called by or calls) the project code 128. The project binary 112 includes the dependencies 107, with portions of the other project binaries 130 depending on (e.g., called by or calling) the project binary 112. The compiler 110 may be used to compile the other project code 140 to create the other project binaries 142.

The project function 114 makes a call to one or more components in one or more third-party libraries 116. The one or more third-party libraries 116 may include open-source libraries or other types of libraries. Each component function 120 shown in FIG. 1 is a compiled file that is in a binary or intermediate code (e.g., bytecode) format. For illustration purposes, components 118(A), 118(B), and 118(C) are shown in the third-party libraries 116. However, it should be understood that these are merely examples and that the project function 114 may use hundreds or even thousands of components accessible via third-party libraries 116. For illustration purposes, the component 118(A) includes at least component functions 120(A1), 120(A2), the component 118(B) includes a component function 120(B1), and the component 118(C) includes sub-component function versions 120(C1) to 120(CN) (N>0).

For illustration purposes, the project function 114 has a relationship 132(1) (a dependency) to component function 120(A1), a relationship 132(2) to component function 120(B1), and a relationship 132(3) to component function 120(C1). For example, the relationships 132 may include importing a type, making a call (from a project function to a component function), or another type of dependency. The relationships 132(1), 132(2), and 132(3) are direct dependencies. If component function 120(A1) has a relationship with component function 120(C1) (as illustrated by the dotted arrow), then the project function 114 has a direct dependency to component function 120(A1) and an indirect (also referred to as a transitive) dependency to component function 120(C1). Such transitive dependencies can give rise to diamond dependencies. For example, in FIG. 1, the component function 118(A) has a function with two versions, component function 120(A1) (version A1) and component function 120(A2) (version A2). Assume component functions 120(A1) and component function 120(A2) both have a dependency on component function 120(C1), as illustrated by the dotted arrows in FIG. 1. Assume that the developer discovers an issue with component function 120(A1) and therefore upgrades to using component function 120(A2). For example, the developer modifies project function 114 to call component function 120(A2) instead of component function 120(A1). If the issue attributed to component function 120(A1) is actually caused by the transitively referenced function, component function 120(C1), then modifying the project function 114 to use component function 120(A2) instead of component function 120(A1) will not resolve the issue. For this reason, the system 100 determines dependency graphs to identify diamond dependencies and provide upgrade recommendations to the developer that take into account the diamond dependencies. If the diamond dependencies were not discovered, the developer might, for example, modify project function 114 to use component function 120(A2) instead of component function 120(A1), and still have the issue (e.g., vulnerability) caused by the transitively referenced function, component function 120(C1).

A database 122 is communicatively coupled to the development system 102. The database 122 includes multiple projects 123 in the development system 102, packages 124 used by each of the projects 123, dependencies 126 associated with each of the packages 124, and known vulnerabilities 127 associated with the dependencies 127.

A scheduler 129 causes a recommendation engine 128 to execute periodically (e.g., at a pre-determined time interval, such as every day, every week, or the like) or in response to an occurrence of a particular event, such as discovery of a new vulnerability associated with one or more of the dependencies 126. For each particular project of the projects 123, the recommendation engine 128 determines the associated packages 124. For each of the packages 124, the recommendation engine 128 determines the associated dependencies 126. For each particular dependency (in the dependencies 126) associated with a particular package of the packages 124, the recommendation engine 128 determines if the dependency is to be analyzed. To determine the dependencies 126, the recommendation engine 128 may determine call graphs 148 associated with the project code 104. Details regarding determining the call graphs 148 is described in more detail in FIG. 2.

Ignoring Particular Types of Dependencies

The recommendation engine 128 may ignore certain types of direct dependencies, based on how the recommendation engine 128 is configured. For example, the recommendation engine 128 may ignore test dependencies. A test dependency provides a test-related functionality (e.g., dump of values of local parameters or other troubleshooting-related functionality, or the like) and is used when developing the code. After code development is complete and the code is deployed, the test dependency is not present. Thus, any vulnerabilities associated with the test dependency do not matter. The recommendation engine 128 may ignore unused dependencies. An unused dependency is a dependency that is declared but not actually used in the code. Thus, the recommendation engine 128 can ignore any vulnerabilities related to an unused dependency. The recommendation engine 128 may ignore dependencies that have no vulnerabilities. In this case, even though the dependency is used, the dependency does not have any vulnerabilities. The software developer may not want to go to the trouble of upgrading the dependency because the dependency does not introduce any vulnerabilities. The configuration of the recommendation engine 128 is something that is under the control of the software developer. For example, the software developer can select "ignore test dependencies" or "ignore unused dependencies" in the settings and these selections will configure the recommendation engine 128 accordingly.

For each particular dependency (in the dependencies 126), the recommendation engine 128 determines a set of (one or more) upgrade candidates 139. If a number of upgrade candidates 139 satisfies a particular threshold, then the recommendation engine 128 may heuristically trim the set of upgrade candidates 139 to create a subset 140 (of upgrade candidates) to reduce the execution time. For example, the subset 140 may include component functions 120(1) to 120(P), where 0<P<=N.

Detect Breaking Changes

For each upgrade candidate (component functions 120(1) to 120(P)) in the subset 140, the recommendation engine 128 determines whether the upgrade would cause a breaking change. The process of detecting breaking changes is described in more detail in patent application Ser. No. 18/740,976, from which this application claims priority and which is incorporated herein in its entirety by reference. Determining whether an upgrade candidate would cause a breaking change takes as input a high-level description of a vulnerability associated with an open-source component and produces as output an enriched vulnerability description that includes code-level information about affected functions and affected component versions. Based on a security advisory, the recommendation engine 128 determines an existence of a vulnerability in a function in a third-party library. For example, an artificial intelligence (AI) 146 may determine information about one of the vulnerabilities 127 in one of the functions 120 from the security advisory. The security advisory may be published by the National Vulnerability Database (NVD) or another similar organization. The recommendation engine 128 determines vulnerability data, including function versions (e.g., 120(C1), 120(C2), to 120(CN)) associated with a particular function of the functions 120.

The recommendation engine 128 may determine a commit history associated with the particular function (that was identified in the security advisory). Each commit includes both (1) the actual code changes, e.g., lines of code that have been added, removed, and/or changed in particular source code files, as well as (2) metadata, such as author information, a textual summary of the changes, a timestamp, other change-related information, or any combination thereof. The recommendation engine 128 may determine fix commits associated with the particular function, based on the commit history. Fix commits are a set of the particular changes (commits) that change the project's source code by fixing or otherwise resolving the vulnerability. The identification of fix commits may be done using various techniques, including using an artificial intelligence AI 146. In some cases, the commits, which are a textual description or summary of the changes, may include either a function identifier or a description of the vulnerability, similar to what is described in vulnerability information included in the advisory. In other cases, the code changes in the third-party libraries 116 may be analyzed to determine whether a particular commit is related to the vulnerability. The set of candidate commits may be reduced by comparing commit timestamps, publication dates of vulnerability disclosure, and the like. In some cases, additional resources may be used to identify fix commits, such as other documents that discuss or describe the vulnerability, e.g., tickets in project management software (e.g., Jira), or resources describing how to exploit the vulnerability.

The fix commits may be used to identify functions 120 affected by the vulnerability and to determine the functions 120 that have been modified to address the vulnerability by one of the commits. For example, this may be done by comparing the files before and after a change is made, using either their textual representation or using various abstractions and representations of source code, such as abstract syntax trees. In some cases, functions that are not directly related to the vulnerability may be excluded to keep the data being analyzed to a manageable amount. For example, functions 120 may be included as part of fix commits, if the developers, in addition to providing a fix for the vulnerability, performed other changes at the same time and included them in the commit, e.g., the fix commit was not limited to the vulnerability. A resulting set of functions may include both (1) the signature of the respective function, as well as (2) different representations of the functions, such as, for example, abstract syntax trees, data or control flow graphs, bytecode, and the like.

The recommendation engine 128 may perform a search to identify components and component versions that include the affected functions (e.g., functions affected by the vulnerability). The recommendation engine 128 may search downloaded packages to determine if the function affected by the vulnerability is included and if so which version of the function is included. The recommendation engine 128 may determine identifiers of package versions that include fixed or vulnerable versions of the function. For example, a search may be performed by obtaining packages from package registries (e.g., the third-party libraries 116, such as Maven Central, npm registry, or the like) and determining whether they include the function in the vulnerable form or in a fixed form. For example, some package registries may provide a search function to facilitate performing such a search, while other package registries may be downloaded and indexed to enable the entire package registries to be searched. In some cases, the code portion of downloaded packages may be searched and compared against affected functions to determine not only whether the function is included, but whether the function is included in the vulnerable form or the fixed form (vulnerability addressed). Such a comparison may involve the source code representation, abstractions thereof (e.g., abstract syntax trees or control flow graphs), their compiled form, or any combination thereof.

The result is an enhanced vulnerability description that includes information about functions affected by one or more vulnerabilities, including their signatures as well as representations of vulnerable and fixed function bodies, e.g., the source code as found in the version control system (VCS), or other representations, depending on the programming language, as well as abstract syntax trees, control and data flow graphs, bytecode, compiled code, or any combination thereof. In some cases, the results may include identifiers of package versions that include fixed or vulnerable versions of the affected functions. Vulnerable functions within the context of software development projects may be identified by searching the commit history of an open-source project (e.g., Github) repository for fixes. In addition, vulnerability databases, such as npm and the like, that document vulnerabilities for which a fix is available, may be searched. The project code 104 in the development system 102 may be modified in such a way that the project code 104 uses the fixed versions of the function and does not use vulnerable version of the function. Thus, vulnerability databases may be augmented using various types of analysis, including reachability analysis. The recommendation engine 128 may query vulnerability databases for component names of components that include a vulnerability. In many systems, such as the Java ecosystem, code that includes a vulnerability may be copied and used in multiple components with each of the multiple components having different names. Thus, the systems and techniques search third-party libraries for code segments that include known vulnerabilities, including code segments that have been reused in multiple components.

The recommendation engine 128 may emulate a state of a dependency graph 125 after the candidate upgrade and determine potential issues, such as diamond dependencies. A diamond dependency occurs when a current version and a newer version of a component in a third party library both have a dependency on (e.g., use) a same sub-component. If the sub-component has an issue (e.g., vulnerability), then upgrading to the newer version will not address the vulnerability.

The recommendation engine 128 determines the previously mentioned information (e.g., call graphs, vulnerabilities, breaking changes, diamond dependencies, and the like) and determines the number of issues (e.g., vulnerability and the like) that will be fixed if an upgrade is performed. The recommendation engine 128 determines additional information associated with each upgrade candidate version, such as, for example, a quality score, a security score, popularity, an activity score and other factors such as licenses 158 and the like. The recommendation engine 128 combines the above information into a risk-benefit score that describes the potential improvements and potential risks if the upgrade is performed.

Scores

The recommendation engine 128 collects and analyzes a large amount of information associated with (1) the packages 124 (that includes the packages 106 specific to the project code 104) and (2) the components in the third-party libraries 116 to compute scores 130. Every open-source package and private package is scored across different characteristics to capture both the security and the operational aspects of a risk. The scores 130 include, for example, activity score 150, popularity score 152, security score 154, and quality score 156. The scores 150, 152, 154, 156 provide a high-level, easy-to-understand metric associated with a particular characteristic (e.g., security, activity, popularity, and code quality) of a package.

The security score 154 indicates the number of security-related issues associated with a particular third-party (e.g., open-source) package, including known vulnerabilities, how well the package developers follow security best practices when developing the code for the package, and the results of static code analysis. Packages with a lower security score 154 have more security-related issues when compared with packages with a higher security score 154.

The activity score 150 indicates the level of development activity associated with a particular third-party (e.g., open-source) package based on information provided by the source code management system in which the package is developed. A particular package with a higher activity score 150 has more active and is presumably better maintained as compared to a package with a lower activity score 150.

The popularity score 152 indicates how widely (popular) a particular package is used in its ecosystem based on (1) tracking both source code management system metrics (e.g., the number of stars in GitHub) and (2) how many other packages import (have a dependency on) the particular package. Thus, a particular package with a high popularity score 152 indicates that it is more widely used and therefore probably has fewer issues compared to a package with a lower popularity score. A package with a higher popularity score 152 is used by many people and so any issues associated with the package are likely to be identified and resolved fairly quickly compared to a less popular package.

The code quality score 156 indicates how well a particular third-party (e.g., open-source) package complies with best practices for code development and includes the results of a static code analysis of that package's source code. A package with a higher quality score 156 has fewer code issues compared to a package with a lower quality score 156.

After determining a set of upgrade candidates 139 for each of the dependencies 126, the recommendation engine 128 uses the scores 150, 152, 154, 156 to compute a risk-benefit score 134 for each upgrade candidate in the set of upgrade candidates 139. The risk-benefit score 134 may, for example, be (i) a score between 1 and 99 (with 1 indicating a low risk/high benefit and 99 indicating a high risk/low benefit), (ii) a score between 1 and 9 (with 1 indicating a low risk/high benefit and 9 indicating a high risk/low benefit), (iii) one of "low", "medium", or "high", or (iv) another type of scoring system.

The recommendation engine 128 may create a subset 140 identifying a portion of the upgrade candidates 139 having the lowest risk-benefit scores 134. For example, the subset 140 may include component functions 120(1) to 120(P) (upgrade candidates) having the N lowest risk-benefit scores (N>0). The upgrade candidates in the subset 140 may be ordered based on the risk-benefit scores 134 to create a prioritized subset 144.

In some cases, the recommendation engine 128 may heuristically trim the set of candidate upgrades 139 to reduce the number of candidates under consideration, without reducing the chances of finding a best upgrade (e.g., resolves one or more major issues, such as vulnerabilities, and has a relatively low risk-benefit score and is therefore unlikely to introduce any new issues). For example, the recommendation engine 128 may spill the upgrade candidates into version ranges (e.g. version 4.5.*, version 4.6.*, and so on) and include the first version and the last version in the range, since it is more likely for a major improvement to be introduced early in the range or vulnerabilities getting fixed towards the end of the range. To illustrate, if there are versions 4.5.1, 4.5.2, 4.5.3, 4.5.4, 4.5.5, 4.5.6, and 4.5.7, then the first version 4.5.1 and the last version 4.5.7 may be analyzed and a risk-benefit score determined for each one prior to selecting one of them as an upgrade candidate. In this way, two candidates instead of seven candidates may be analyzed, thereby reducing the time taken and use of computational resources to identify an upgrade candidate. Of course, the number of versions selected may vary based on the total number of versions that are available. For example, if there are versions 4.5.01 to 4.5.99, then a percentage (Q %) of early versions of a component in a third-party library and a percentage (Q %) of later versions of the component may be selected for analysis. To illustrate, versions 4.5.1, 4.5.2, and 4.5.3 (e.g., Q=3%) of the early versions and versions 4.5.97, 4.5.98, and 4.5.99 of the later versions may be selected for analysis. The number of versions to select is controlled by a user selectable configuration threshold.

The recommendation engine 128 may create emulations of the dependency graphs 125 that emulate a dependency graph if the individual upgrades were to be performed. For example, the dependency graphs 125 may be determined, based at least in part, on the call graphs 148. The dependencies 126 are organized in a graph, with the source project as the root, a node for each dependency, and a link between node A and node B if the dependency A imports/depends on dependency B. Each version of a dependency (e.g. A@v1, A@v2) has a corresponding (different) dependency graph. If the current project uses dependency A @v1, the project's dependency graph contains, as a subset, the dependency graph of A@v1. To emulate the dependency graph after an upgrade A@v1 to A@v2, the A@v1 dependency graph is replaced with that of A@v2 and the recommendation engine 128 looks for issues. In some cases, the issues may include diamond dependencies. The recommendation engine performs an analysis to select a version that fixes issues in the direct dependency and in the transitive dependencies and avoids selecting a version that introduces a new issue (e.g., vulnerability) in the direct dependency itself or in any of the transitive dependencies.

The recommendation engine 128 selects the set of upgrade candidates 139, e.g., a portion of the available versions, such as Q % of the first versions and Q % of the last versions. The recommendation engine 128 emulates the dependency graphs for each upgrade candidate in the set of upgrade candidates 139, determines an associated risk-benefit score 134, and creates the subset 140 with the component functions 120(1) to 120(P) (upgrade candidates) with the lowest risk-benefit scores 134. The recommendation engine 128 orders the component functions 120(1) to 120(P) (upgrade candidates) based on the risk-benefit scores 134 to create the prioritized subset 144 in which the upgrade candidates are prioritized based on the risk-benefit score 134, presenting the lowest risk upgrade candidates first.

The recommendation engine 128 may operate across multiple projects. For each project, the recommendation engine 128 determines the recommended upgrades of direct dependencies At the end, do a global computation to find the recommended upgrade candidates across the multiple projects. The recommendation engine 128 aligns the upgrades across the multiple projects. For example, the recommendation engine 128 may recommend upgrading project A from dependency D@v1 to D@v4. If project A were not taken into account when determining upgrades for project B, the recommendation engine 128 may recommend upgrading project B from D@v2 to D @v3. To align recommendations across multiple projects, the recommendation engine 128 may recommend upgrading to a same version (e.g., D@v4). The result is a smaller number of different versions across all projects after the upgrade (e.g., D@v4, instead of both D@v4 and D@v3).

The recommendation engine 128 generates recommendations for upgrading a single dependency at a time (e.g. upgrade D@v1 to D@v4). In some cases, upgrading a single dependency may not be possible due to conflicts with other direct dependencies. In such cases, the recommendation engine 128 may recommend upgrading multiple direct dependencies at the same time. For example, with languages such as Java, the software developer can directly upgrade a transitive dependency to a new version. The recommendation engine 128 may be configured to determine the best upgrade for a transitive dependency.

Thus, a recommendation engine may determine when to upgrade a dependency of a package to a new version and recommend which is the best version to which to upgrade. The dependencies may be determined by determining call graphs associated with the package. At a high-level, a dependency may be upgraded when there is a newer version that is "better", e.g., meaning less vulnerabilities or better scores (e.g., lower risk-benefit scores) or both. Without the recommendation engine, determining when to upgrade and to which version to upgrade a dependency is very time consuming for a software developer. The recommendation engine dramatically reduces the amount of time the developer uses to maintain the dependencies of a project.

Figure 2:
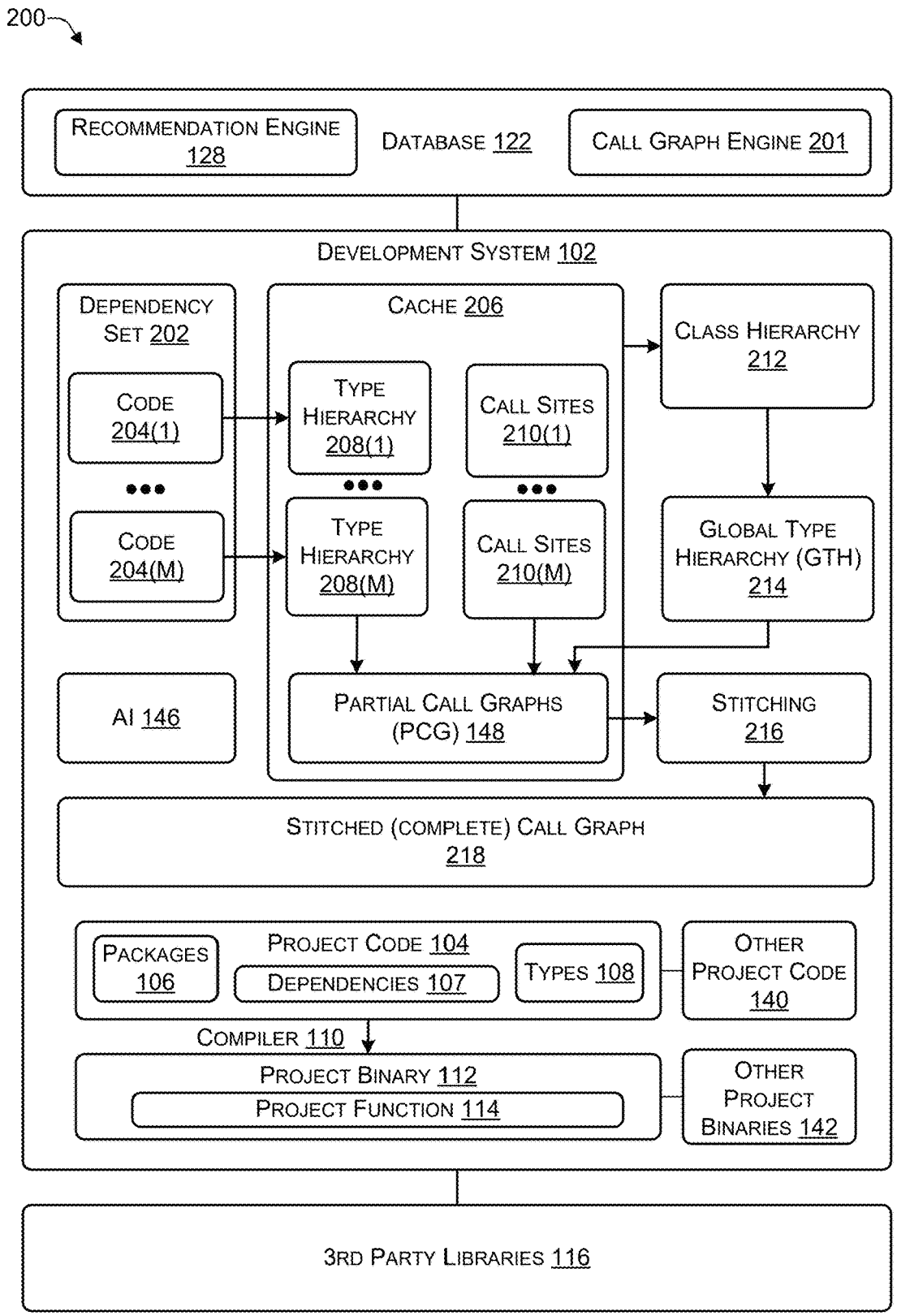
FIG. 2 illustrates a system to stitch together multiple call graphs, according to some embodiments.

FIG. 2 illustrates a system 200 to stitch together multiple call graphs, according to some embodiments. The system 200 illustrates additional components of the development system 102 of FIG. 1 used to create call graphs associated with the project code 104 of FIG. 1.

The recommendation engine 128 may invoke a call graph engine 201. The call graph engine 201 may determine a dependency set 202 associated with the project code 104 that includes code 204(1) to code 204(M) (M>0). For example, for Java code, the code 204 may be in the form of Java archive (.jar) files. The call graph engine 201 may use a cache 206 to store partial call graphs associated with the project code 104. For example, the code 204(1) may have an associated type hierarchy 208(1) and associated call sites 210(1) and the code 204(M) may have an associated type hierarchy 208(M) and associated call sites 210(M). Based on the cache 206, the call graph engine 201 may create a class hierarchy 212 and determine a global type hierarchy 214. Based on the type hierarchy 208 and the call sites 210, the call graph engine 201 may create partial call graphs 148. The partial call graphs 148 may be fed into a stitching algorithm 216 that stitches the partial call graphs 148 to create a stitched call graph 218 (also referred to as simply a "call graph").

FIG. 2 illustrates a system in which the call graph engine 201 constructs a stitched CG 218 using a Class-Hierarchy Analysis (CHA) of the project code 104 by expanding invocation targets found in the bytecode. The call graph engine 201 does this by adding links to all overriding methods within the matching subtypes that override the original targets. The system 200 enables scalable CG generation for program code to enable fast analysis of the code, even in resource-limited environments. The system 200 may determine partial call graphs 148 and then stitch them together to generate the stitched call graph 218.

The call graph engine 201 resolves dependencies 107 in the project code 104 to generate the complete dependency set 202. For each of the dependencies 107, the call graph engine 201 requests a partial analysis result from the partial call graphs 148 in the cache 206 if available, or creates the partial analysis result if it does not exist in the cache 206. The partial analysis result includes (1) the partial call graph(s) 148 associated with the isolated dependency, including static Call Sites (CSs) 210 found in the bytecode and (2) the type hierarchy 208 including all types, their parent type, and the associated components that are declared in each dependency.

The call graph engine 201 builds a global type hierarchy (GTH) 214 and merges the individual type information from the type hierarchies 208 of the partial analysis results. The call graph engine 201 creates a class hierarchy 212. The call graph engine 201 creates the stitched call graph 218 by stitching 216 the partial call graphs 148. Constructing the stitched call graph is a complex task and is described in more detail below.

To generate the stitched call graph 218 for the project code 104, the call graph engine 201 determines the dependency set 202 for the project code 104 by performing dependency resolution (e.g., resolving all dependencies 107). Note that dependency resolution may not always be deterministic. For example, a new release of a dependency, either a direct dependency or a transitive dependency, may alter the dependency resolution result from the perspective of a particular package. Although the set of available packages may remain stable, the dependency resolution results can vary depending on different contexts. For example, a client application P may have direct dependencies on two versioned packages, A and B, both of which transitively rely on a library L. However, each of these versioned packages may use a different version of L (e.g., package A uses L V1 and package B uses L V2), leading to a resolution conflict. To resolve this conflict, a breadth-first search algorithm may be used to select the version of L that is "closest" in the dependency tree of client application P. This is because having two versions of the same package in a dependency set simultaneously is not possible. Therefore, the closest version strategy prioritizes the most relied-upon version. Thus, depending on whether P depends on A or not, the resolved dependency set 202 might differ when viewed from the perspective of B. Overall, there are two issues that make it difficult to simply generate a CG for an application and its dependencies. First, the use of a specific dependency version may be contextual. Secondly, the merging of partial results is not straightforward and may involve a significant amount of interaction between the partial results, which may vary based on the chosen dependency versions. For illustration purposes, FIGS. 3, 4, 5 provide examples of a dependency set, partial call graphs, and a global type hierarchy.

Figure 3:
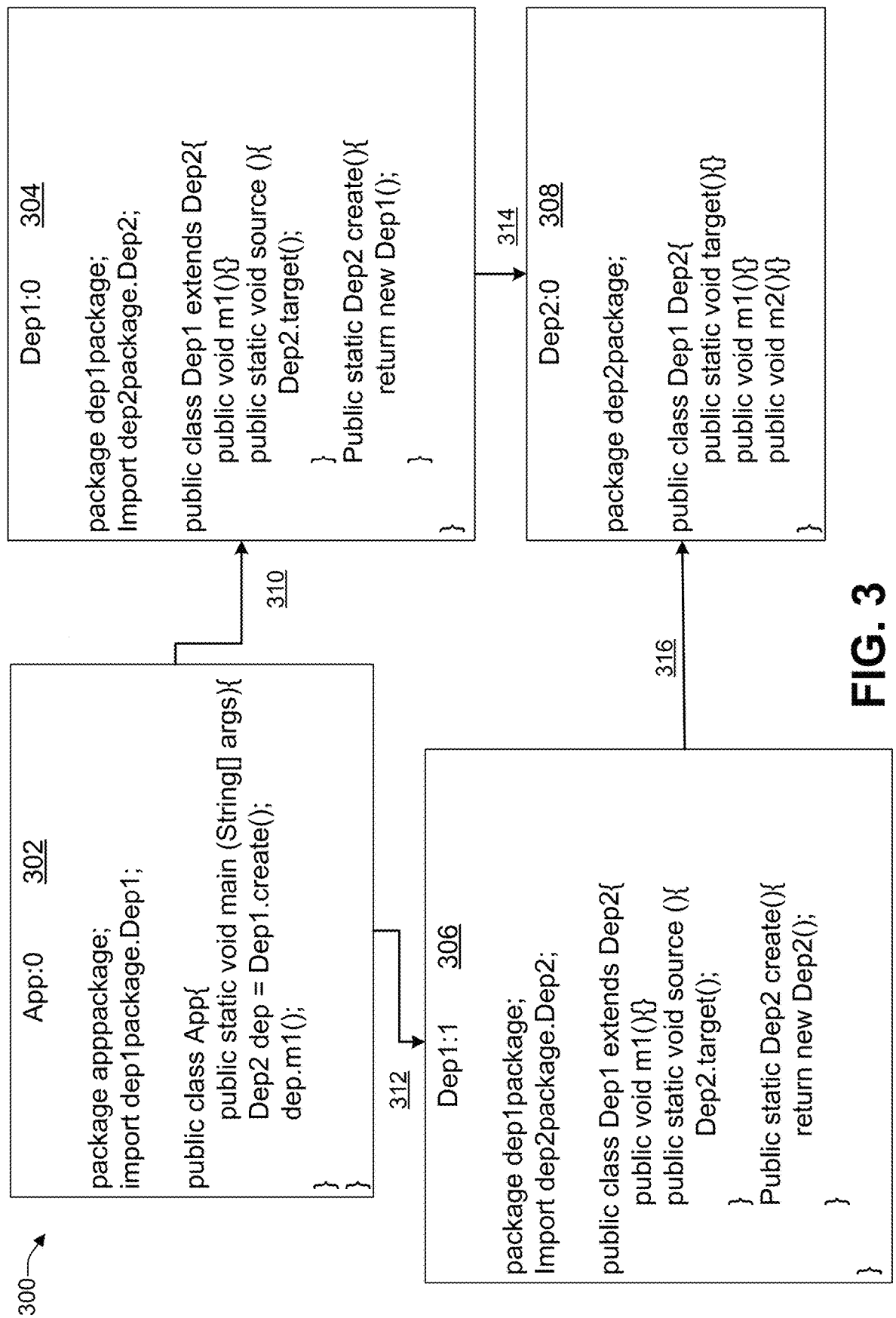
FIG. 3 illustrates an example of a dependency set, according to some embodiments.

FIG. 3 illustrates an example 300 of a dependency set (such as the dependency set 202 of FIG. 2), according to some embodiments. FIG. 3 illustrates an example of a dependency set and interactions among versioned packages. For example, 302, 403, 306, 308 may be Java archive (.jar) files or similar files used in another programming language. A JAR (Java Archive) file is a package file format used to aggregate multiple Java class files and associated metadata and resources (such as text, images, etc.) into one file. This format is commonly used to distribute application software or libraries on the Java platform. Of course a JAR files is used purely as an example and another type of similar archive file may be used for another programming language. Application (program code) App:0 302 depends on Dep1:0 304 and Dept 1:1 306.

Dep1:0 304 depends on Dep2:0 308.

Dep1:1 306 depends on Dep2:0 308.

The dependency set illustrated in FIG. 3 includes three versioned packages 304, 306, 308, with dependency relations depicted by arrows 310, 312, 314, 316. As illustrated, version 0 (Dep1:0 304) of Dep1 and version 1 (Dep1:1 306) of Dep1 each depend on Dep2 (Dep2:0 308). A time sensitive dependency resolution is illustrated in this example, where App:0 302 specifies a version range dependency on com.example:dep1:[0, 1]. This results in a time-sensitive dependency resolution for App:0 302. For example, if the resolution is performed at time t1 when the latest released version of Dep1 is 0, then Dep1:0 304 is included in the dependency set. If the resolution is done at time t2, after version 1 of Dep1 (306) has also been released, then the result includes version 1 (306). This time-sensitive dependency resolution highlights contextuality.

Another issue occurs at a more granular level, where Dep1 invokes the target( ) from Dep2:0 308. In a more complex scenario, Dep1 may extend Dep2 and override m1( ). In the class App, the object dep is used to call m1( ). Depending on the specific type of variable dep, any overridden m1( ) from sub-classes of Dep2 could be invoked. The exact type of dep depends on the time of dependency resolution. For example, if the dependency resolution occurs at t1, then we use dep1:0 and the implemented create( ) method in this version returns a Dep1 instance, resulting in a call to Dep1.m1( ) in the App class. However, at t2, when version 1 is used, an instance of Dep2 is returned, and thus the callee of this call would be Dep2.m1( ). In this example, the type Dep2 is used to declare the variable dep, which is referred to as the "receiver type". Determining the exact type of the receiver object is a challenging problem. The CHA algorithm generates a CG by including all potential edges from all subtypes, such as Dep2 and its subtypes, including Dep1. To generate a whole-program CG from partial results, the information that is fixed for a versioned package can be stored and enough context information about the versioned package is preserved to allow the partial results to be merged later in the process. For CG generation, this minimal information is the partial call graph (PCG) for the isolated dependency and its declared types and methods. For simplicity, this data is referred to as a PCG. Whenever a whole-program CG is to be generated, dependency resolution is performed and the resolved dependency set is subsequently use, as described herein.

A whole-program CG is generated by collecting the PCGs for all direct or transitive dependencies of the project being analyzed. The dependency set has been previously created and a basic in-memory key-value store is used to manage access to the individual results and to act as a cache (temporary storage area). The key of each PCG is a coordinate that may include a groupId, an artifactId, and a version, which uniquely identifies a package within the system. If a PCG has been previously determined and cached, it can be directly returned, thereby eliminating redundant processing. However, if the PCG is not available in the cache (because it has not yet been created), then the PCG is created and added to the cache for future use.

To create the PCGs, the binary (e.g., .jar file) of the dependency is downloaded. A static analyzer is used to build a CG for this isolated versioned package and is then transformed into a PCG. The static analyzer may consider that non-private classes, fields, and methods are accessible from outside, non-final classes are extendable and non-final methods are overridable. The static analyzer may enable rewriting of invoke dynamic instructions to make them easier to analyze. A PCG may include two different types of information: (i) a snapshot of the (incomplete) type hierarchy that is declared within the versioned package, including the declared methods, and (ii) information about call sites (CS) within the versioned package.

FIG. 4 illustrates simplified examples of partial call graphs (PCGs) for versioned packages in the example dependency set shown in FIG. 3 (resolved at time t1), according to some embodiments. FIG. 4 includes App:0 402, Dep1:0 404, and Dep2:0 406.

Type Hierarchy PCGs store a Type Hierarchy (TH) that is defined in a versioned package. The systems and techniques use a naming convention (similar to Java bytecode) to identify types. For example, the type App in the Java package apppackage may be referred to as /apppackage/App. The systems and techniques differentiate between types that have been declared inside the current versioned package (internal) and those in dependencies (external). For every stored type, the systems and techniques preserve the list of declared components. As Java supports virtual components, this may be used to infer override relations. The systems and techniques store the method signatures and preserve their name, list of parameters (including types), and the return type. For example, the signature of the well-known equals method Object.equals(Object) may be stored as equals(/java.lang/Object)/java.lang/BooleanType. The data model used by the systems and techniques allows for the storage of arbitrary metadata as key-value pairs to enable future use cases. For example, the data model may be used to mark abstract components (referred to as methods in Java) without implementation.

Information obtained to later create a CG includes a list of Call Sites (CS) identified in the partial call graph (PCG). A CS is an instruction in the bytecode that results in a component (e.g., method) call. For each CS, the systems and techniques identify the source (surrounding) component and the target component that is being called and store this pair as one call relation. For each call relation, the bytecode instruction type is stored, e.g., static invocation. As FIG. 4 illustrates, CSs of each source component are indexed by their program counter (PC). Since PC is unique for each invocation site, the PC may be used as a key. While this approach is helpful for tracing the results, any type of unique key may be used as an index for each CS. For example, in the case of the App class, there are two CS in the main component. In the first one, dep is declared, and in the second one, dep is used to call method m1( ). The receiver type of the first CS is /dep1package/Dep1 and it is used to call the create( ) component. In the second CS, /dep2package/Dep2 is the receiver type because it is the type of the variable dep. The first call uses static invocation while the second one uses virtual invocation. For each CS, the systems and techniques may store the signature of the target component. In the previous example, the first call's signature is create( )/dep2package/Dep2 and the second one is m1( ). A CHA algorithm is used to build the PCGs. Static information, such as receiver type, invocation instruction, and target signature, which are available in the bytecode itself, may be used. The data model is simple, making it easy to add an efficient, binary disk serialization. Generating the PCGs is expensive so storing the PCGs in a cache across different analysis executions results in a reduction in computation time and memory usage. For example, build server integration may preserve partial results from build to build for a substantial speed-up. Alternatively or in addition, a central server may host an in-memory storage to store frequently used dependencies across multiple projects.

FIG. 5 illustrates an example 500 of a global type hierarchy (GTH) of example versioned packages, according to some embodiments. The GTH 214 of FIG. 2 may include three tables: a parents index 502, a defined methods (components) 504, and a children index 506. The parent index 502 includes a type column 508 and an ordered list of parents column 510. The defined methods (components) 504 includes a type column 512, a signature column 514, and a package (pkg) column 516. The children index 506 includes a children index type column 518, and a set of all children column 520.

The GTH 214 may be determined after determining the PCGs for the different packages in the resolved dependency set 202 of FIG. 2. The (incomplete) typing information of the individual versioned packages may be merged into a (complete) global type hierarchy 214. This creates a complete picture of the type-system that is used when executing the whole program, referred to as the Global Type Hierarchy (GTH) 214. Assuming that the dependency set 202 is complete, merging the individual type hierarchies 208 can be performed by joining the sets of internal types stored in the individual type hierarchies 208. For example, consider the example dependency set in FIG. 3 (resolved in t1). This set is DepSet={app:0, dep1:0, dep2:0} and therefore
GTH=THapp:0∪T Hdep1:0∪T Hdep2:0.

Unresolved external types included in the type hierarchies 208 may appear as an internal type in one of the other versioned packages. For convenience and efficient traversal of type hierarchies 208, this information may be transformed into multiple index tables. These index tables 502, 504, 506 are shown in FIG. 5 for the versioned package examples of FIG. 3. Each type is indexed using its full name since this name is unique in the classpath of the program (otherwise it could not be compiled). Three different index tables 502, 504, 506 are created. The first table 502 stores the parents of each type based on the inheritance order. For example, because class /dep1package/Dep1 directly extends /dep2package/Dep2, therefore the first parent that appears in the parent list of /dep1package/Dep1 is /dep2package/Dep2. This sequence continues for each type until the /java.lang/ Object class is reached. After the list of all parent classes, a set of all interfaces that a type or any of its parents' implement is appended. This is because Java gives precedence to classes. In addition, the order of super interfaces that are appended to the list of parents does not matter because there cannot be two interfaces with default implementations of the same signature in the parent list of a type.

The parent index table 502 may not be directly used during stitching. Instead, the parent index table 502 may be used to facilitate creating the children index 506 and defined methods (components) index 504. Another index that may be created is a list of all children of a particular type, the children index 506. Types that extend or implement a given type may be identified, including indirect relationships through inheritance. Indirect relationships occur when a type's ancestor extends/implements the given type, such as a grandparent. This set may not keep any order. The final index in the GTH 214 is the list of methods that each type defines or inherits, as shown in the defined methods index 504.

The signatures 514 in the defined methods (components) 504 may be used as an index to identify in which versioned package they are implemented. For example, if a method (component) is not implemented in a current type itself, then identify a first parent that implements it. The ordered list of parents in the parent index 502 may be used to efficiently retrieve this information. For example, as shown in FIG. 5 /dep1package/Dep1 inherits method m2( ) from its dependency dep2:0. Because /dep1package/Dep1 overrides m1( ), the index points to dep1:0 as the defining versioned package of this signature. After the PCGs 148 are ready and the global type hierarchy 214 has been established for the complete dependency set 202, the stitching 216 is performed. The stitching 216 connects the call sites 210 found in the bytecode with all potential method (component) implementations that can be reached by the corresponding invoke instruction.

Figure 6:
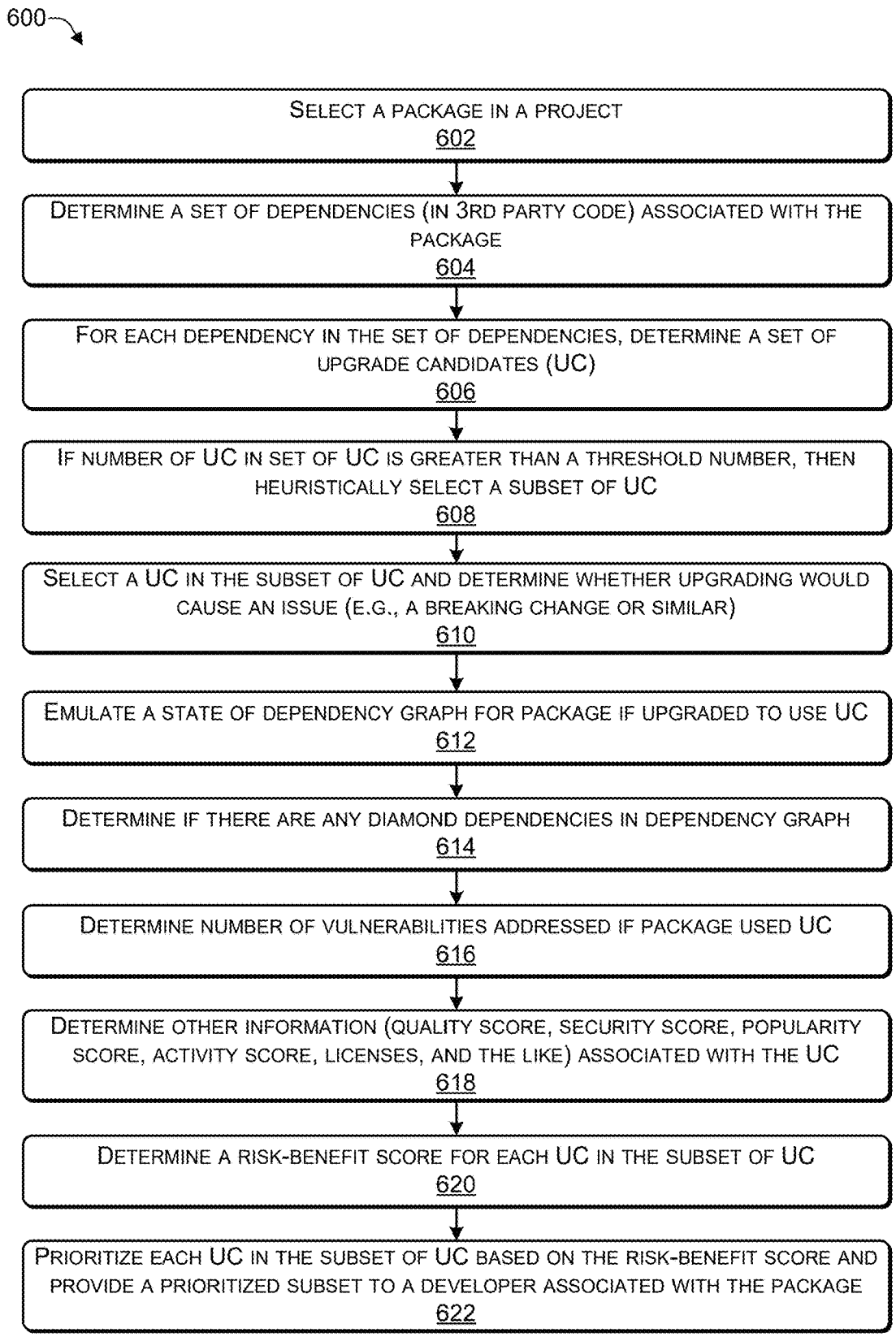
FIG. 6 is a process to create a prioritized set of upgrade candidates, according to some embodiments.
Figure 7:
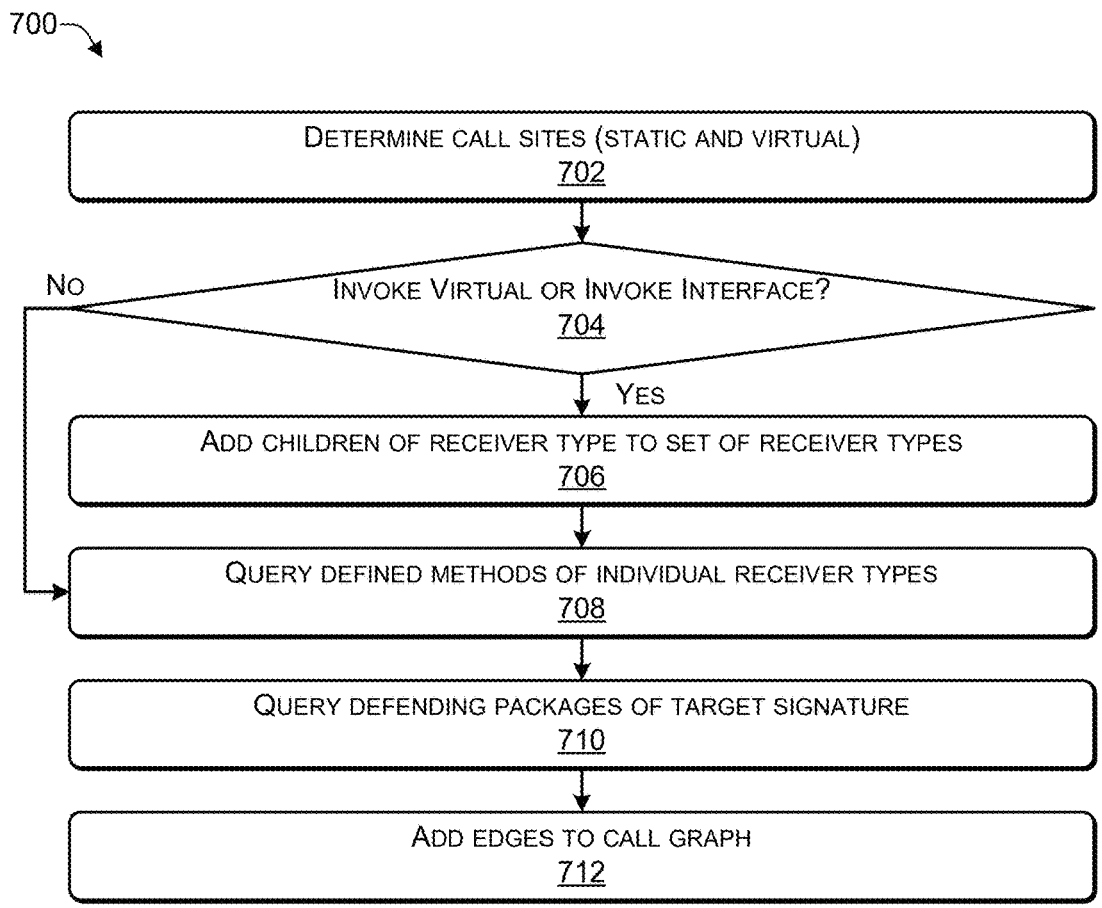
FIG. 7 is a process that includes adding edges to a call graph, according to some embodiments.
Figure 8:
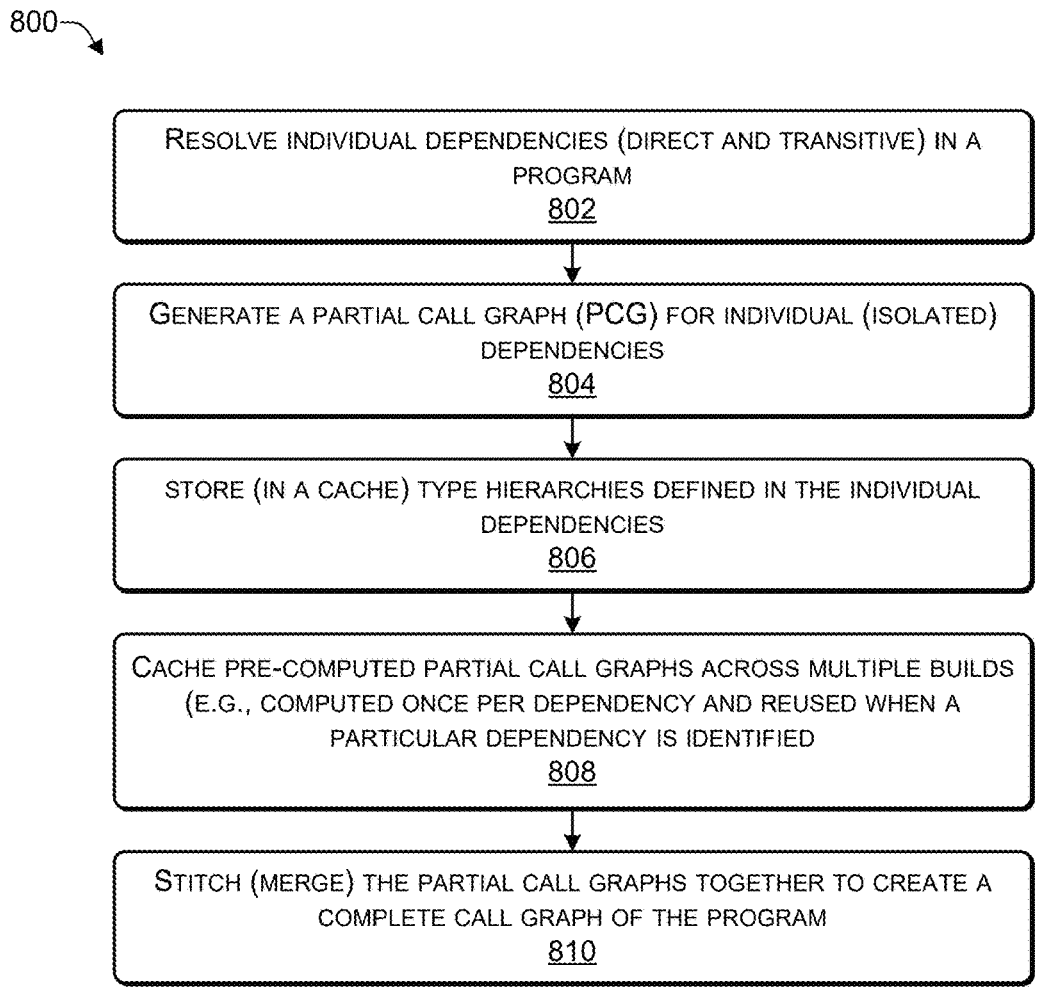
FIG. 8 is a process that includes stitching (merging) partial graphs, according to some embodiments.

In the flow diagrams of FIGS. 6, 7, and 8, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. The processes 600, 700, and 800 are described with references to one or more of FIGS. 1, 2, 3, 4, and 5 above, but it should be understood that they may be implemented using various other models, frameworks, systems and environments.

FIG. 6 is a process 600 to create a prioritized subset of upgrade candidates, according to some embodiments. The process 600 may be performed by the recommendation engine 128 of FIG. 1.

At 602, the process may select a package in a project. At 604, the process may determine a set of dependencies (in third-party code) associated with the package. For example, in FIG. 1, the recommendation engine 128 may select a particular package of the packages 124 and determine the dependencies 126 associated with the particular package. For example, the dependencies 126 may identify one or more components in the third-party libraries 116 that are called by code in the particular package.

At 606, for each dependency in the set of dependencies, the process may determine a set of upgrade candidates. At 608, if the number of update candidates in the set of upgrade candidates is greater than a threshold number, then the process may heuristically select a subset of the upgrade candidates. For example, in FIG. 1, for each dependency in the dependencies 126, the recommendation engine 128 may determine the set of upgrade candidates 139. For example, the upgrade candidates 139 may include all available versions of a particular component 118 and the third-party libraries 116. To illustrate, if the project function 114 uses the component function 120(C1), the set of upgrade candidates 139 may include the component functions 120(C2) to 120(CN). If the recommendation engine 128 determines that the number of upgrade candidates in the set of upgrade candidates 139 is greater than a predetermined threshold, then the recommendation engine 128 may heuristically select the subset 140. For example, if the predetermined threshold is six and there are five upgrade candidates, then the recommendation engine 128 uses all five of the upgrade candidates as the subset 140. If the predetermined threshold is six and there are 10 upgrade candidates (V1.1.0 to V1.1.9), then the recommendation engine 128 may heuristically select the first three versions (e.g., V1.1.0, V1.1.1, V1.1.2) and the last three versions (e.g., V1.1.7, V1.1.8, V1.1.9) for inclusion in the subset 140.

At 610, the process may select an upgrade candidate in the subset of upgrade candidates and determine whether upgrading would cause an issue (e.g., a breaking change). At 612, the process may emulate a state of a dependency graph for the package if the package were modified to use the upgrade candidate. At 614, the process may determine if there are any diamond dependencies. At 616, the process may determine a number of vulnerabilities addressed if the package were modified to use the upgrade candidate. At 618, the process may determine other information associated with the upgrade candidate, such as, for example, a quality score, security score, a popularity score, an activity score, a number of licenses, and the like. At 620, the process may determine a risk-benefit score for each upgrade candidate in the subset of upgrade candidates based on the information gathered, including the state of the dependency graph, diamond dependencies, number vulnerabilities addressed, and other information (quality score, security score, popularity score, activity score, number of licenses, and the like) associated with each upgrade candidate. At 622, the process may prioritize each upgrade candidate in the set of upgrade candidates based on the risk-benefit score and provide a prioritized subset of upgrade candidates to a code developer associated with the package. For each upgrade candidate, e.g. the component functions 120(1) to 120(P), in the subset 140, the recommendation engine 128 may determine an associated risk-benefit score 134 based on multiple factors. The risk-benefit score 134 may be determined based on determining whether upgrading to the associated component function 120 would cause an issue such as a breaking change. The risk-benefit score 134 may be determined based on emulating a state of the dependency graph 125 for the package if the package were modified to use the component function 120. The risk-benefit score 134 may be determined based on determining if there are any diamond dependencies for the associated component function 120. The risk-benefit score 134 may be determined based on a number of vulnerabilities addressed if the package were modified to use the upgrade candidate (component function 120). The risk-benefit score 134 may be determined based on other information, such as a quality score 156, a security score 154, a popularity score 152, an activity score 150, a number of licenses 158, and the like. The component functions 120 in the subset 140 may be ordered based on the risk-benefit scores 134 to create the prioritized subset 144, with the lowest risk upgrade candidates being listed first and the highest risk upgrade candidates being listed last. The recommendation engine 128 may present the prioritized subset 144 to one or more code developers associated with the package that was analyzed to enable the code developers to make an informed decision as to which upgrade candidates to use to address as many issues (e.g., vulnerabilities) as possible and to reduce the number of additional issues introduced by using the upgrade candidates.

Thus, a project may be analyzed to determine dependencies in each particular package included in the project. The dependencies are relationships between the package and third-party libraries, such as open-source software. For example, the code in the package may call functions or import types in the third-party library. For each dependency, a recommendation engine may determine a set of upgrade candidates. If the number of upgrade candidates in the set of upgrade candidates is greater than a threshold amount, then the recommendation engine may heuristically select a subset of the upgrade candidates. For each upgrade candidate in the subset of upgrade candidates, the recommendation engine may determine various information, such as whether upgrading would cause an issue (e.g., a breaking change), determine if there are any diamond dependencies, emulate a state of a dependency graph for the package if the package were upgraded to use the upgrade candidate, determine a number of vulnerabilities addressed if the package were to use the upgrade candidate, and determine other information, such as a quality score, a security score, popularity score, an activity score, a number of licenses, and the like. Based on the various information, the recommendation engine may determine a risk-benefit score for each upgrade candidate in the subset of upgrade candidates and prioritize each upgrade candidate based on the risk-benefit score to provide a prioritized subset to a developer associated with the package.

FIG. 7 is a process 700 that includes adding edges to a call graph, according to some embodiments. The process 700 may be performed by the call graph engine 201 of FIG. 2.

At 702, the process determines call sites (e.g., statis and virtual). At 704, the process determines whether the invocation type is either invoke virtual or invoke interface. If the process determines, at 704, that "yes" the invocation type is invoke virtual or invoke interface, then the process proceeds to add children of a receiver type to a set of receiver types, at 706. The process then proceeds to 708. If the process determines, at 704, that "no" the invocation type is neither invoke virtual nor invoke interface, then the process proceeds to 708. At 708, the process queries defined methods of individual receiver types. At 710, the process queries defending packages of a target signature. At 712, the process adds edges to a call graph.

In FIG. 2, after the call graph engine 201 has determined the PCGs 148 and used those to determine the global type hierarchy 214 for the dependency set 202, the call graph engine 201 performs the stitching 216 by connecting the CSs 210 found in the bytecode with method (component) implementations that can be reached by the corresponding invoke instruction. After creating the GTH 214, the call graph engine 201 processes the call sites 210 associated with the partial call graphs 148.

A Java virtual machine (JVM) supports five different invocation types that have specific handling (invoke static, invoke virtual, invoke interface, invoke special, and invoke dynamic). Based on the invocation type, the call graph engine 201 selects the correct resolution strategy for the call when processing the call sites 210. While different invocation types may be handled differently within JVM, to create the call graph 218, the five different invocation types are categorized as being either (1) dynamic dispatch (invoke virtual, invoke interface) or (2) regular dispatch (invoke static, invoke special). Of course, for other programming languages, similar, appropriate categories may be used for invocation types.

Invoke static is used for regular static calls. This may be directly resolved by adding an edge from the surrounding method to the static target from the instruction. If the dependency set is a valid resolution, the target type exists in the GTH 214 and has a matching method declaration signature either implemented in the type itself or in one of its parents. A static call T1.m( ) may have an implementation of min (T1 or one of its parents). If this is not the case, the resolved dependency set is invalid and not executable.

Invoke special is used for calling non-overridable methods (components), such as private methods, super methods, constructors, and the like. Similar to static invocation, the target type of the call site is identified in the GTH 214. The call graph engine 201 may look up the method (component) with a matching signature to draw an edge. For example, to resolve the constructor call T2.<init>0, the call graph engine 201 lookups T2 and search for a parameter-less constructor.

Invoke virtual. Instructions that use dynamic dispatch during runtime invoke virtual and invoke interface are typically challenging to resolve. In Java, the corresponding call sites point to a base type or to an interface, but during runtime, the receiving instance may have any possible subtype of the base type. For example, even if the bytecode includes an invocation of the Object.hash Code( ) method, the receiver type might be any type in the GTH 214 that overrides the hash Code method. Similarly, while the bytecode might contain a reference to T3.hashCode( ), T3 might not override the method, but inherits it from its superclass, in which case the correct target of the invocation is the method declared in the superclass. The call graph engine 201 supports both cases and searches for matching method signatures in all subtypes of the target and draws edges to those that can be called. If there is none, the call graph engine 201 finds the first supertype that implements the signature.

Invoke interface: This invocation is handled in the same way as invoke virtual in the Java Virtual Machine (JVM). Some modifications (optimizations) may be performed by the JVM based on which instruction is used in the bytecode. These modifications are done on the virtual method table of JVM which the call graph engine 201 does not use. Moreover, for an invoke interface, it is possible to encounter target methods that are defined outside of the hierarchy of the target type. For example, consider a base type B that implements m and an interface I that also defines m. A subtype S implements I and extends B. Because m is inherited, there is no reason to implement m. For a call graph generator, this is a challenging situation, because the invoke interface instruction points to I, while the correct target is B.m, despite B having no relation with I. The call graph engine 201 is able to handle these cases.

Invoke dynamic: Some versions of the JVM provide an invoke dynamic instruction to support alternate programming languages that may use more advanced invocation logic. Resolving such invocations is the most challenging part of call graph generating tools. Existing frameworks usually have limited support for these invocations because they use very expensive operations (due to their highly dynamic nature). Some frameworks may rewrite these invocations using other invocation instructions. The framework used for partial call graph (PCG) construction has a feature to rewrite them, which is used to handle invoke dynamic automatically (without special reasoning). For example, consider a scenario in which a framework uses the invoke virtual instruction to transform a particular CS that was initially an invoke dynamic CS. During the bytecode analysis for PCG creation, the modified version of the CS is stored. Subsequently, in the stitching 216 phase, the dynamic dispatch handling technique that was previously explained is used.

FIG. 7 illustrates how the call sites 210 and the GTH 214 are used to resolve each of the call sites 210 associated with the dependency set 202. Consider the second call site of App.main with pc=2. Because this invocation uses a virtual instruction, the dynamic dispatch category is used to handle it. To do that, the process first queries the children index 506 of FIG. 5 of the GTH 214 to retrieve all children of dep2package/Dep2. The result of this query is /dep1package/Dep1. This child type is added to the list of receivers. The defined methods within the /dep1package/Dep1 and /dep2package/Dep2 are queried using the defined methods index 504 of FIG. 5 of the GTH 214. With this information, the process determines the location of the target method. Specifically, the process queries the result of the previous step for the method signature of m1( ). This identifies the two places where m1( ) is defined and which are potential targets of this call. The first place is the implementation within dep1:0 inside Dep1 class and the second place is the implementation in dep2:0 in the Dep2 class. The next call sites are similarly processed. After all the partial call graphs 148 have been processed, the resulting stitched call graph 218 may be used for further static analysis.

TABLE 1

| | All Source Methods | All CSs |
|---|---|---|
| 1 | /app:0/apppackage/App.main(java.lang/String[ ]) | pc = 1 |
| | | pc = 2 |
| 2 | /dep1:0/dep1package/Dep1.source( ) | pc = 1 |
| ... | ... | ... |

For the first source method (/app:0/apppackage/App.main (java.lang/String[ ])) and pc=1, this is a static invocation. Thus, in this case, at 704, the answer is "No" and /dep1package/Dep1 is at 708. At 710, create( )/dep2package/Dep2. At 712, add dep1:0 as an edge to the call graph.

For the first source method and pc=2, this is a virtual invocation. Thus, in this case, at 704, the answer is "yes". At 706, add /dep2package/Dep2. At 708, query {/dep2package/Dep2, /dep2package/Dep1}. At 710, m1( ). At 712, add {dep1:0, dep2:0}.

For the second source method, pc=1, this is a static invocation. Therefore, the answer at 704 is "no" and /dep2package/Dep2 goes to 708. From 708, target( ) goes to 710. At 712, add dep2:0 as an edge to the call graph.

FIG. 8 is a process that includes stitching (merging) partial graphs, according to some embodiments. The process may be performed by the call graph engine 201 of FIG. 2.

At 802, the process resolves individual dependencies (both direct and transitive) in a program. At 804, the process generates a partial call graph (PCG) for individual (isolated) dependencies. At 806, the process stores (in a cache) type hierarchies defined in the individual dependencies. At 808, the process caches pre-computer partial call graphs across multiple builds. Thus, the partial call graphs are computed once per dependency and then reused when a particular dependency (associated with the partial call graph) is identified. At 810, the process stitches the partial call graphs together to create a complete call graph of the program.

For example, in FIG. 2, the call graph engine 201 resolves individual dependencies (both direct and transitive) of the project code 104 to create the dependency set 202. The call graph engine 201 generates the partial call graphs (PCG)

148 for individual (isolated) dependencies in the set of dependencies 202. The call graph engine 201 stores (in the call graph cache) type hierarchies defined in the individual dependencies. At 808, the call graph engine 201 caches pre-computer partial call graphs across multiple builds. Thus, the partial call graphs 148 are computed once per dependency and then reused when a particular dependency is identified. At 810, the call graph engine 201 stitches the partial call graphs 148 together to create the stitched (complete) call graph 218 of the project code 104.

Experimental Results

Experiments were performed using 50 randomly selected packages. Resolve the complete dependency sets for the selected versioned packages. During the dependency resolution process, may see "missing artifact" errors in some cases. In other cases, the dependency resolution may result in an empty dependency set, which either means that they were a project object mode (POM) and do not contain code, or they do not include any dependencies. In such cases, discard them and select another random versioned package until there are 50 fully resolved dependency sets. The dependency sets include a total of 1044 versioned packages (906 unique versioned packages). On average, the selected versioned packages had 20 dependencies and consisted of 113 files (6051 including dependencies). To mimic a representative environment, the experiments were conducted limiting memory to 7 GB (e.g., which is currently the available memory size for Linux build jobs on GitHub). Remove versioned packages for which one of the approaches failed due to Out Of Memory Exception.

The main benefit of the use partial CGs to generate complete CGs is the speedup it provides due to fewer computations. After selecting dependency sets, perform the following on each dependency set D. (1) generate full CGs using the call graph engine 201 of FIG. 2. For each versioned package in D, generate and parse it into a PCG. Create the Cache using the PCGs. For each versioned package in D, fetch PCGs from the Cache and then stitch them to create stitched CGs. (2) Generate a full CG for D. (3) Measure time information and statistics of the previous steps to determine out how fast the call graph engine 201 can create the CGs.

The experimental results for these 50 dependency sets is as follows. On average, the call graph engine 201 takes 5 s to generate a CG for each dependency set, while conventional techniques take at least 20% more time. The average time for the call graph engine 201 for the first round of generation is 18.1 s. This includes PCG generation and caching for the entire set of dependencies, as well as the stitching process. However, subsequent rounds benefit from a significant speed improvement because of the cached PCGs. Generating a PCG for a dependency versioned package is a onetime process that needs to be done only once. After that, the cached dependencies can be used in different builds. Initially, the call graph engine 201 may take longer than conventional techniques due to the combination of caching PCGs and stitching. However, in subsequent software builds, the call graph engine 201 saves a lot of time by pre-computing the common parts. Over time, the enhanced speed results in significant time savings, which accumulate with repeated use and translate into considerable overall efficiency gains. The experimental results show that the call graph engine 201 generates CGs that are at least 98% accurate compared to those generated using other techniques. Additionally, the call graph engine 201 shows a significant improvement in performance, with up to 38% lower execution time on average and memory usage of only 388 megabytes for the whole program analysis.

Figure 9:
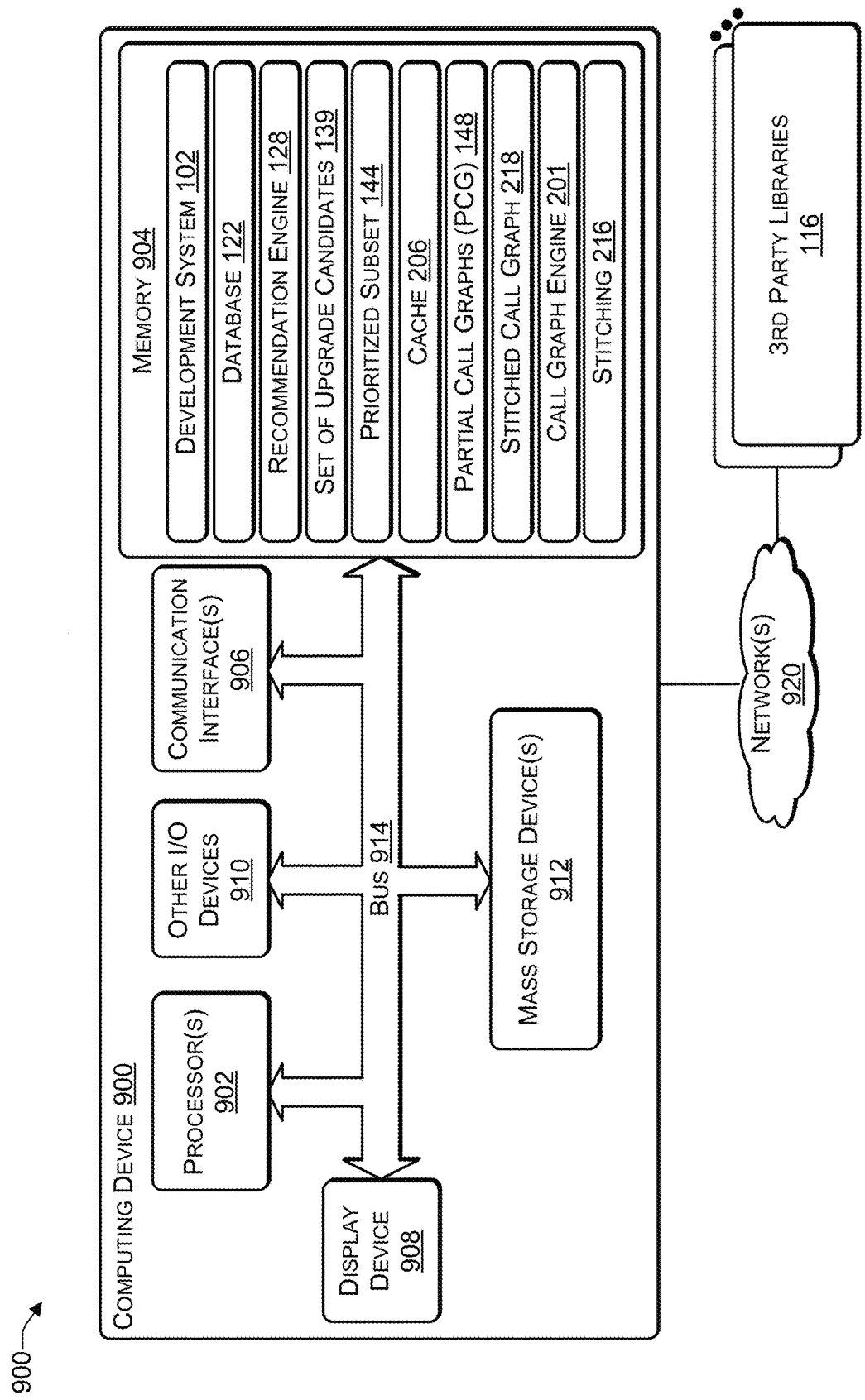
FIG. 9 is a block diagram of a computing device that can be used to implement the systems and techniques described herein.

FIG. 9 illustrates an example configuration of a computing device that can be used to implement the systems and techniques described herein, such as hosting the development system 102 of FIG. 1 or being used to train the AI 146. The computing device 900 may include one or more processors 902 (e.g., central processing unit (CPU), graphics processing unit (GPU), AI processing units (AIPU), or any combination thereof), a memory 904, communication interfaces 906, a display device 908, other input/output (I/O) devices 910 (e.g., keyboard, trackball, and the like), and one or more mass storage devices 912 (e.g., disk drive, solid state disk drive, or the like), configured to communicate with each other, such as via one or more system buses 914 or other suitable connections. While a single system bus 914 is illustrated for ease of understanding, it should be understood that the system buses 914 may include multiple buses, such as a memory device bus, a storage device bus (e.g., serial ATA (SATA) and the like), data buses (e.g., universal serial bus (USB) and the like), video signal buses (e.g., ThunderBolt®, digital video interface (DVI), High-Definition Multimedia Interface (HDMI), and the like), power buses, etc.

The processors 902 are one or more hardware devices that may include a single processing unit or a number of processing units, all of which may include single or multiple computing units or multiple cores. The processors 902 may include a GPU and/or AIPU that is integrated into the CPU or the GPU and/or AIPU may be a separate processor device from the CPU. The processors 902 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 902 are configured to fetch and execute computer-readable instructions stored in the memory 904, mass storage devices 912, and other types of non-transitory computer-readable media.

Memory 904 and mass storage devices 912 are examples of non-transitory computer storage media (e.g., memory storage devices) for storing instructions that can be executed by the processors 902 to perform the various functions described herein. For example, memory 904 may include both volatile memory and non-volatile memory (e.g., RAM, ROM, or the like) devices. Further, mass storage devices 912 may include hard disk drives, solid-state drives, removable media, including external and removable drives, memory cards, flash memory, floppy disks, optical disks (e.g., compact disc (CD), digital versatile disc (DVD)), a storage array, a network attached storage, a storage area network, or the like. Both memory 904 and mass storage devices 912 may be collectively referred to as memory or computer storage media herein and include any type of non-transitory media capable of storing computer-readable, processor-executable program instructions as computer program code that can be executed by the processors 902 as a particular machine configured for carrying out the operations and functions described in the implementations herein.

The computing device 900 may include one or more communication interfaces 906 for exchanging data via the network(s) 920. The communication interfaces 906 can facilitate communications within a wide variety of networks and protocol types, such as a representative network 920 that may include wired networks (e.g., Ethernet, DOCSIS, DSL, Fiber, USB etc.) and wireless networks (e.g., WLAN, GSM, CDMA, 802.11, Bluetooth®, Wireless USB, ZigBee®, cellular, satellite, etc.), the Internet and the like. Communication interfaces 906 can also provide communication with external storage, such as a storage array, network attached storage, storage area network, cloud storage, or the like.

The display device 908 may be used for displaying content (e.g., information and images) to users. Other I/O devices 910 may be devices that receive various inputs from a user and provide various outputs to the user, and may include a keyboard, a touchpad, a mouse, a printer, audio input/output devices, and so forth.

The computer storage media, such as memory 904 and mass storage devices 912, may be used to store software and data as shown in FIG. 9. For example, the memory 904 may be used to store the development system 102, the database 122, the recommendation engine 128, the set of upgrade candidates, the prioritized subset 144, the cache 206, the PCGs 148, the call graph engine 201, and the stitching 216. The computing device 900 may be connected to one or more third-party libraries 116 via one or more networks 920.

The systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computer-implemented method comprising:
   selecting a package in a software project;
   determining a set of dependencies in the package based on:
   resolving direct dependencies in the package; and
   resolving indirect dependencies in the package;
   generating a partial call graph for each dependency in the set of dependencies to create a set of partial call graphs;
   storing the set of partial call graphs in a partial call graph cache;
   based on determining that a particular dependency in the set of dependencies is not included in the partial call graph cache, creating and storing a partial analysis result in the partial call graph cache, the partial analysis result including one or more partial call graphs associated with the particular dependency, including static call sites found in bytecode and a type hierarchy that includes types, parent types, and associated components declared in the particular dependency;
   based on determining that the particular dependency in the set of dependencies is included in the partial call graph cache, requesting the partial analysis result from the set of partial call graphs;
   merging individual type hierarchies to build a global type hierarchy, wherein the individual type hierarchies are derived from the partial analysis result;
   stitching together the set of partial call graphs to create a complete call graph of the package;
   determining unreachable code in the package based on the complete call graph of the package;
   determining a set of upgrade candidates for the particular dependency in the set of dependencies;
   based on determining that a number of upgrade candidates in the set of upgrade candidates is greater than a predetermined threshold, selecting a subset of the upgrade candidates;
   selecting an upgrade candidate in the subset of upgrade candidates;
   determining issues associated with upgrading the package to use the upgrade candidate, including:
   determining security vulnerabilities based on the complete call graph;
   determining a number of vulnerabilities addressed by upgrading the package to use the upgrade candidate; and
   determining a severity of vulnerabilities addressed by upgrading the package to use the upgrade candidate;
   determining a risk-benefit score associated with each upgrade candidate in the subset of the upgrade candidates;
   prioritizing each of the upgrade candidates in the subset of the upgrade candidates based on the associated risk-benefit score to create a prioritized subset of the upgrade candidates; and
   providing, via a display device, the prioritized subset of the upgrade candidates to a developer associated with the package.

2. The computer-implemented method of claim 1, wherein selecting the subset of the upgrade candidates comprises: selecting a predetermined number of early versions of the upgrade candidates; and selecting a predetermined number of later versions of the upgrade candidates.

3. The computer-implemented method of claim 1, wherein determining the risk-benefit score associated with each upgrade candidate in the subset of the upgrade candidates comprises:

the issues associated with upgrading the package to use the upgrade candidate;
the number of vulnerabilities addressed by upgrading the package to use the upgrade candidate; and
the severity of the vulnerabilities addressed by upgrading the package to use the upgrade candidate.

4. The computer-implemented method of claim 1, wherein determining the issues associated with upgrading the package to use the upgrade candidate comprises:
determining a security score indicating a number of security-related issues associated with a third-party package in which the upgrade candidate is included.

5. The computer-implemented method of claim 1, wherein determining the issues associated with upgrading the package to use the upgrade candidate comprises:
determining a popularity score indicating an amount of usage received by a particular third-party package based at least in part on:
tracking source code management system metrics; and
how many other packages have a dependency on the particular third-party package.

6. The computer-implemented method of claim 1, wherein determining the issues associated with upgrading the package to use the upgrade candidate comprises:
determining a code quality score indicating how well a particular third-party package complies with best practices for code development.

7. The computer-implemented method of claim 1, wherein determining the issues associated with upgrading the package to use the upgrade candidate comprises: determining a number of licenses associated with the upgrade candidate.

8. A server comprising:
one or more processors; and
one or more non-transitory computer readable media storing instructions executable by the one or more processors to perform operations comprising:
selecting a package in a software project;
determining a set of dependencies in the package based on:
resolving direct dependencies in the package; and
resolving indirect dependencies in the package;
generating a partial call graph for each dependency in the set of dependencies to create a set of partial call graphs;
storing the set of partial call graphs in a partial call graph cache;
based on determining that a particular dependency in the set of dependencies is not included in the partial call graph cache, creating and storing a partial analysis result in the set of partial call graphs, the partial analysis result including one or more partial call graphs associated with the particular dependency, including static call sites found in bytecode and a type hierarchy that includes all types, parent types, and associated components declared in the particular dependency;
based on determining that the particular dependency in the set of dependencies is included in the partial call graph cache, requesting the partial analysis result from the set of partial call graphs;
merging individual type hierarchies to build a global type hierarchy, wherein the individual type hierarchies are derived from the partial analysis result;
stitching together the set of partial call graphs to create a complete call graph of the package;
determining unreachable code in the package based on the complete call graph of the package;
determining a set of upgrade candidates for the particular dependency in the set of dependencies;
based on determining that a number of upgrade candidates in the set of upgrade candidates is greater than a predetermined threshold, selecting a subset of the upgrade candidates;
selecting an upgrade candidate in the subset of upgrade candidates;
determining issues associated with upgrading the package to use the upgrade candidate, including:
determining security vulnerabilities based on the complete call graph;
determining a number of vulnerabilities addressed by upgrading the package to use the upgrade candidate; and
determining a severity of vulnerabilities addressed by upgrading the package to use the upgrade candidate;
determining a risk-benefit score associated with each upgrade candidate in the subset of the upgrade candidates;
prioritizing each of the upgrade candidates in the subset of the upgrade candidates based on the associated risk-benefit score to create a prioritized subset of the upgrade candidates; and
providing, via a display device, the prioritized subset of the upgrade candidates to a developer associated with the package.

9. The server of claim 8, wherein selecting the subset of the upgrade candidates comprises: selecting a predetermined number of early versions of the upgrade candidates; and selecting a predetermined number of later versions of the upgrade candidates.

10. The server of claim 8, wherein determining the risk-benefit score associated with each upgrade candidate in the subset of the upgrade candidates comprises:
the issues associated with upgrading the package to use the upgrade candidate;
the number of vulnerabilities addressed by upgrading the package to use the upgrade candidate; and
the severity of the vulnerabilities addressed by upgrading the package to use the upgrade candidate.

11. The server of claim 8, wherein determining the issues associated with upgrading the package to use the upgrade candidate comprises:
determining a number of breaking changes that would result from upgrading the package to use the upgrade candidate.

12. The server of claim 8, wherein determining the set of dependencies associated with the package comprises: ignoring test dependencies; and ignoring unused dependencies.

13. The server of claim 8, wherein determining the issues associated with upgrading the package to use the upgrade candidate comprises:
determining a security score indicating a number of security-related issues associated with a third-party package in which the upgrade candidate is included.

14. The server of claim 8, wherein determining the issues associated with upgrading the package to use the upgrade candidate comprises:
determining a number of licenses associated with the upgrade candidate.

15. One or more non-transitory computer readable media capable of storing instructions executable by one or more processors to perform operations comprising:

selecting a package in a software project;
determining a set of dependencies in the package based on:
resolving direct dependencies in the package; and
resolving indirect dependencies in the package;
generating a partial call graph for each dependency in the set of dependencies to create a set of partial call graphs;
storing the set of partial call graphs in a partial call graph cache;
based on determining that a particular dependency in the set of dependencies is not included in the partial call graph cache, creating and storing a partial analysis result in the set of partial call graphs, the partial analysis result including one or more partial call graphs associated with the particular dependency, including static call sites found in bytecode and a type hierarchy that includes all types, parent types, and associated components declared in the particular dependency;
based on determining that the particular dependency in the set of dependencies is included in the partial call graph cache, requesting the partial analysis result from the set of partial call graphs;
merging individual type hierarchies to build a global type hierarchy, wherein the individual type hierarchies are derived from the partial analysis result;
stitching together the set of partial call graphs to create a complete call graph of the package;
determining unreachable code in the package based on the complete call graph of the package;
determining a set of upgrade candidates for the particular dependency in the set of dependencies;
based on determining that a number of upgrade candidates in the set of upgrade candidates is greater than a predetermined threshold, selecting a subset of the upgrade candidates;
selecting an upgrade candidate in the subset of upgrade candidates;
determining issues associated with upgrading the package to use the upgrade candidate, including:
determining security vulnerabilities based on the complete call graph;
determining a number of vulnerabilities addressed by upgrading the package to use the upgrade candidate; and
determining a severity of vulnerabilities addressed by upgrading the package to use the upgrade candidate;
determining a risk-benefit score associated with each upgrade candidate in the subset of the upgrade candidates;
prioritizing each of the upgrade candidates in the subset of the upgrade candidates based on the associated risk-benefit score to create a prioritized subset of the upgrade candidates; and
providing, via a display device, the prioritized subset of the upgrade candidates to a developer associated with the package.

16. The one or more non-transitory computer readable media of claim 15, wherein determining the risk-benefit score associated with each upgrade candidate in the subset of the upgrade candidates comprises:
the issues associated with upgrading the package to use the upgrade candidate;
the number of vulnerabilities addressed by upgrading the package to use the upgrade candidate; and
the severity of the vulnerabilities addressed by upgrading the package to use the upgrade candidate.

17. The one or more non-transitory computer readable media of claim 15, wherein determining the issues associated with upgrading the package to use the upgrade candidate comprises: determining an activity score indicating an amount of development activity associated with a third-party package in which the upgrade candidate is included.

18. The one or more non-transitory computer readable media of claim 15, wherein determining the issues associated with upgrading the package to use the upgrade candidate comprises: determining a security score indicating a number of security-related issues associated with a third-party package in which the upgrade candidate is included.

19. The one or more non-transitory computer readable media of claim 15, wherein determining the issues associated with upgrading the package to use the upgrade candidate comprises:
determining a popularity score indicating an amount of usage received by a particular third-party package based at least in part on:
tracking source code management system metrics; and
how many other packages have a dependency on the particular third-party package.

20. The one or more non-transitory computer readable media of claim 15, wherein determining the set of dependencies associated with the package comprises: ignoring test dependencies; and ignoring unused dependencies.

* * * * *